United States Patent
Eckart et al.

(10) Patent No.: US 10,482,196 B2
(45) Date of Patent: Nov. 19, 2019

(54) MODELING POINT CLOUD DATA USING HIERARCHIES OF GAUSSIAN MIXTURE MODELS

(71) Applicant: NVIDIA Corporation, Santa Clara, CA (US)

(72) Inventors: Benjamin David Eckart, Pittsburgh, PA (US); Kihwan Kim, Sunnyvale, CA (US); Alejandro Jose Troccoli, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 699 days.

(21) Appl. No.: 15/055,440

(22) Filed: Feb. 26, 2016

(65) Prior Publication Data

US 2017/0249401 A1    Aug. 31, 2017

(51) Int. Cl.
| | |
|---|---|
| *G06F 17/50* | (2006.01) |
| *G06F 17/18* | (2006.01) |
| *G06K 9/00* | (2006.01) |
| *G06K 9/62* | (2006.01) |

(52) U.S. Cl.
CPC .......... *G06F 17/5009* (2013.01); *G06F 17/18* (2013.01); *G06K 9/00986* (2013.01); *G06K 9/6219* (2013.01); *G06K 9/6277* (2013.01); *G06K 9/6282* (2013.01); *G06F 2217/16* (2013.01)

(58) Field of Classification Search
CPC .............................. G06F 17/18; G06K 9/6212
See application file for complete search history.

(56) References Cited

U.S. PATENT DOCUMENTS

| | | | | |
|---|---|---|---|---|
| 5,857,169 | A  * | 1/1999 | Seide ...................... | G10L 15/14 704/221 |
| 7,333,923 | B1 * | 2/2008 | Yamanishi ....... | G06Q 10/06395 702/179 |
| 2005/0131869 | A1* | 6/2005 | Xie .................... | G06F 17/30787 |
| 2012/0184840 | A1* | 7/2012 | Najarian ................ | G06K 9/629 600/408 |
| 2014/0153802 | A1* | 6/2014 | Jenzri ................... | G06T 7/0016 382/131 |
| 2015/0009214 | A1* | 1/2015 | Lee .......................... | G06T 17/10 345/420 |

(Continued)

OTHER PUBLICATIONS

A robot Self Localization Method Based on Image Retrieval System by Liu Dongbo et al, pp. 548-552, Chinese Journal of Sensor and Actuators (Year: 2010).*

(Continued)

*Primary Examiner* — Saif A Alhija

(74) *Attorney, Agent, or Firm* — Leydig, Voit & Mayer, Ltd.

(57) ABSTRACT

A method, computer readable medium, and system are disclosed for generating a Gaussian mixture model hierarchy. The method includes the steps of receiving point cloud data defining a plurality of points; defining a Gaussian Mixture Model (GMM) hierarchy that includes a number of mixels, each mixel encoding parameters for a probabilistic occupancy map; and adjusting the parameters for one or more probabilistic occupancy maps based on the point cloud data utilizing a number of iterations of an Expectation-Maximum (EM) algorithm.

20 Claims, 17 Drawing Sheets

(56) References Cited

U.S. PATENT DOCUMENTS

| | | | |
|---|---|---|---|
| 2017/0249401 A1* | 8/2017 | Eckart | G06F 17/5009 |
| 2018/0003839 A1* | 1/2018 | Lowell | G01V 1/345 |
| 2018/0046885 A1* | 2/2018 | Barker | G06T 7/75 |
| 2018/0165544 A1* | 6/2018 | Isert | G05D 1/0231 |

OTHER PUBLICATIONS

An Efficient Probabilistic Occupancy Map-Based People Localization Approach, Yen-Shuo Lin et al, IEEE, 4 pages (Year: 2015).*
Bernardini, F. et al., "The Ball-Pivoting Algorithm for Surface Reconstruction," IEEE Transactions on Visualization and Computer Graphics, vol. 5, No. 4, 1999, pp. 349-359.
Chen, J. et al., "Scalable Real-Time Volumetric Surface Reconstruction," ACM Trans. Graph., vol. 32, No. 4, 2013, pp. 1-10.
Cignoni, P. et al., "Metro: Measuring error on simplified surfaces," Computer Graphics Forum, vol. 17, No. 2, 1998, pp. 167-174.
Giles, M. et al., "Advanced Interactive Visualization for CFD," Computing Systems in Engineering, vol. 1, No. 1, 1990, pp. 51-62.
Hahnel, D. et al., "Learning Compact 3D Models of Indoor and Outdoor Environments with a Mobile Robot," 2003, pp. 1-7.
Kalaiah, A. et al., "Statistical Geometry Representation for Efficient Transmission and Rendering," ACM Transactions on Graphics, vol. 24, No. 2, 2005, pp. 348-373.
Kammerl, J. et al., "Real-time Compression of Point Cloud Streams," In IEEE International Conference on Robotics and Automation, 2012, pp. 778-785.
Kazhdan, M. et al., "Poisson Surface Reconstruction," Eurographics Symposium on Geometry Processing, 2006, pp. 61-70.
Liu, Y. et al., "Using EM to Learn 3D Models of Indoor Environments with Mobile Robots," In ICML, 2001, pp. 329-336.
Livnat, Y. et al., "A Near Optimal Isosurface Extraction Algorithm Using the Span Space," IEEE Transactions on Visualization and Computer Graphics, vol. 2, No. 1, Mar. 1996, pp. 73-84.
Lorensen, W. E. et al., Marching cubes: A high resolution 3d surface construction algorithm, Computer Graphics, vol. 21, No. 4, Jul. 1987, pp. 163-169.
Newcombe, R. A. et al., "Kinectfusion: Real-time Dense Surface Mapping and Tracking," In IEEE ISMAR, 2011, pp. 127-136.
Newman, T. S. et al., "A survey of the marching cubes algorithm," Computers & Graphics, vol. 30, 2006, pp. 854-879.
Shekhar, R. et al., "Octree-Based Decimation of Marching Cubes Surfaces," In Visualization, IEEE, 1996, pp. 335-342 and 499.
Thrun, S. et al., "A Real-Time Expectation-Maximization Algorithm for Acquiring Multi-Planar Maps of Indoor Environments with Mobile Robots," IEEE Transactions on Robotics and Automation, vol. 20, No. 3, 2004, pp. 433-443.
Triebel, R. et al., "Using Hierarchical EM to Extract Planes from 3D Range Scans," In IEEE ICRA, 2005, pp. 4437-4442.
Turk, G. et al., "Zippered Polygon Meshes from Range Images," In Proceedings of the 21st Annual Conference on Computer Graphics and Interactive Techniques, 1994, pp. 311-318.
Wilhelms, J. et al., "Octrees for Faster Isosurface Generation," ACM Trans. Graph., vol. 11, No. 3, 1992, pp. 201-227.
Zhou, Q.-Y. et al., "Dense Scene Reconstruction with Points of Interest," ACM Transactions on Graphics, vol. 32, No. 4, 2013, pp. 1-8.

* cited by examiner

MODELING POINT CLOUD DATA USING HIERARCHIES OF GAUSSIAN MIXTURE MODELS

FIELD OF THE INVENTION

The present invention relates to point clouds, and more particularly to modeling point cloud data using hierarchies of Gaussian mixture models.

BACKGROUND

Point cloud data is utilized in a variety of applications, and point cloud data is especially important in many spatial perception applications such as augmented reality, scene visualization, and robot navigation. Point clouds are typically represented as a data structure that includes a set of points (e.g., each point may be stored as a vector of three coordinates related to a coordinate system in three-dimensional space). Conventional point processing techniques may be associated with demanding computational power and memory requirements due to the large number of points stored in a given point cloud. For example, a conventional depth camera may generate 100 k raw data points in the point cloud per frame.

In order to facilitate the processing of a large number of points stored in the point cloud, data compression techniques may be used. Techniques may include the separation of points into a spatial subdivision hierarchy such as an octree. Spatial decomposition of the point cloud data can be used to sub-sample the geometry represented by the point cloud by exploiting spatial coherency, but the discretization of 3D space may produce artifacts. Thus, there is a need for addressing these issues and/or other issues associated with the prior art.

SUMMARY

A method, computer readable medium, and system are disclosed for generating a Gaussian mixture model hierarchy. The method includes the steps of receiving point cloud data defining a plurality of points; defining a Gaussian Mixture Model (GMM) hierarchy that includes a number of mixels, each mixel encoding parameters for a probabilistic occupancy map; and adjusting the parameters for one or more probabilistic occupancy maps based on the point cloud data utilizing a number of iterations of an Expectation-Maximum (EM) algorithm.

DETAILED DESCRIPTION

With the availability of different types of active range sensors (e.g., TOF (Time-Of-Flight), Lidar, Structured Light, etc.), tasks including spatial processing, scene understanding, and visualization of large 3D point clouds become one of the most important stages in 3D imaging/vision pipelines. The transition from 2D image processing to 3D point cloud processing obviates the ill-posed problem of extracting 3D structure from a 2D mapping. However, 3D point cloud processing also introduces several challenging problems such as (1) uneven sampling density, (2) point sparsity, and, for some sensors, (3) unstructured organization of the incoming data. Additionally, many modern depth sensors generate millions of data points per second, making it difficult to utilize all incoming data effectively in real-time for devices with limited computational resources.

Specifically, there are two major issues with applications that utilize point cloud data. First, there is a need to compress the point cloud data such that the data is compatible with the available computational resources, such as memory and interface bandwidth. Second, there is a need to extract discrete surface information from the point cloud data for various applications, such as rendering. The following paragraphs detail a parametric representation for a 3D point cloud based on a Gaussian mixture model (GMM) that achieves high-fidelity with lossy compression. Once the hierarchical representation of the point cloud has been created, a novel approach to the Marching Cubes algorithm may be employed in order to extract a polygonal mesh (i.e., a triangle mesh) from the compressed, hierarchical representation of the point cloud.

Figure 1A:
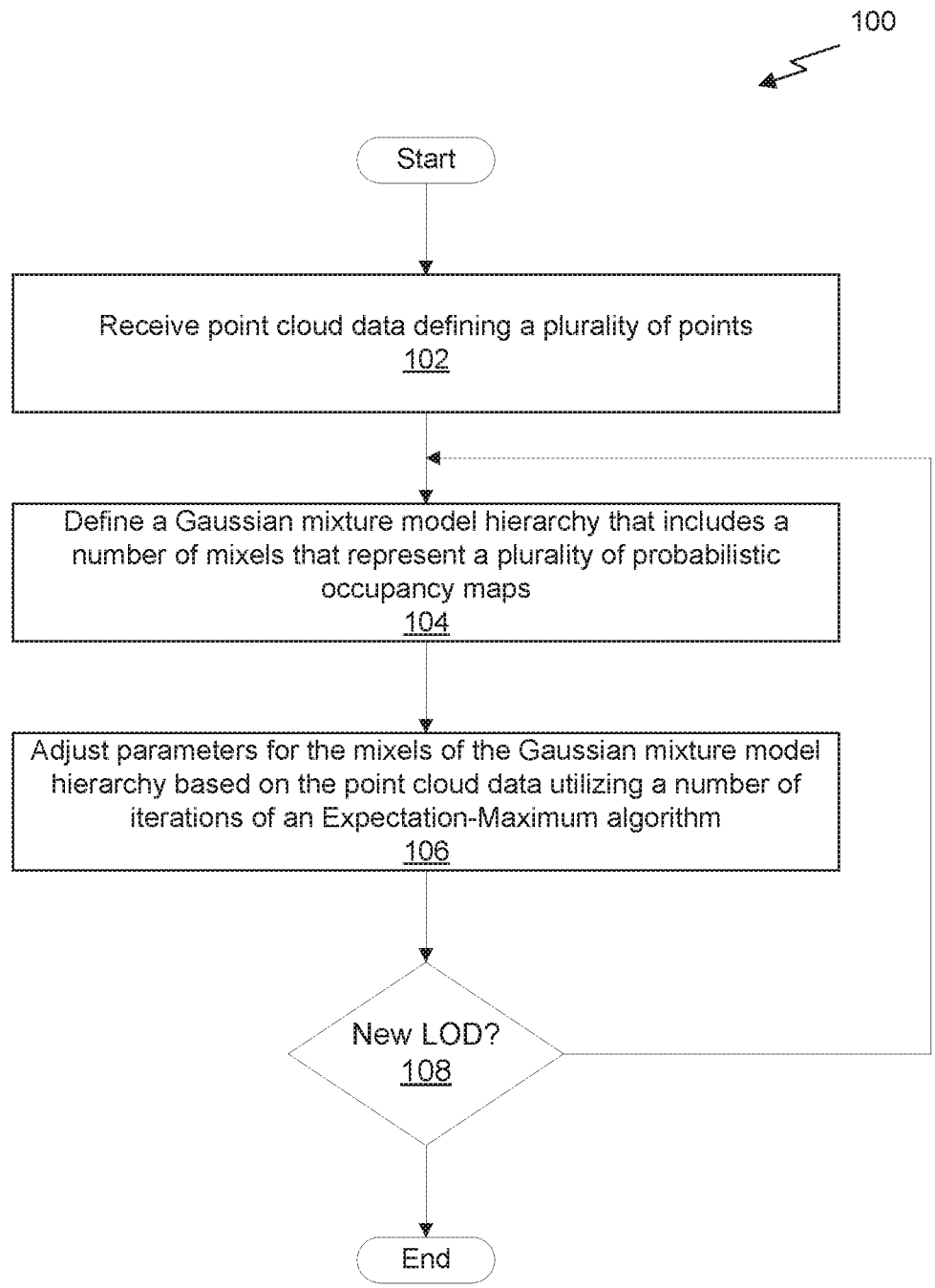
FIG. 1A illustrates a flowchart of a method for generating a hierarchical Gaussian mixture model for point cloud data, in accordance with one embodiment.

FIG. 1A illustrates a flowchart of a method 100 for generating a GMM hierarchy for point cloud data, in accordance with one embodiment. At step 102, point cloud data is received. The point cloud data may include data for a plurality of N-dimensional points. In one embodiment, each point is a three-dimensional point specified by an x-coordinate, a y-coordinate, and a z-coordinate. The point cloud data may be stored in a data structure in a non-volatile memory. The point cloud data may be read into a volatile memory (e.g., SDRAM) and loaded into a processor for processing.

At step 104, a GMM hierarchy is defined that includes a number of mixels that represent a plurality of probabilistic occupancy maps. The GMM hierarchy may be implemented as a data structure, such as a tree, storing a plurality of mixels. A mixel, as used herein, refers to a mixture element that is one component of a probability density function (PDF) that represents a point cloud. Conceptually, mixels are similar to voxels, but with fuzzy, overlapping boundaries and probability densities that vary across a volume. Each mixel encodes a number of parameters for a probabilistic occupancy map. A probabilistic occupancy map is simply a probability density function (PDF) for an unspecified sub-population of the point cloud. The plurality of probabilistic occupancy maps accumulated into a cumulative PDF may, therefore, provide a representation of the point cloud data as a model.

In one embodiment, each probabilistic occupancy map is a PDF for a Gaussian basis function. Each mixel encodes parameters for a corresponding Gaussian basis function, and the mixels are stored in a tree data structure. The parameters may include a mean vector ($\mu$), a covariance matrix ($\Sigma$), and a mixing weight ($\pi$). The tree data structure encodes connectivity data between the mixels that creates a hierarchical GMM having different levels of detail. For example, a mixel may be associated with a parent mixel as well as one or more child mixels.

In one embodiment, the GMM hierarchy may be stored in a tree data structure having eight child nodes per node, where each level of the tree represents an additional level of detail. For example, the tree may include a root node that represents the volume. The root node may have eight child nodes, each child node including a mixel that stores parameters for one Gaussian basis function. Thus, at level 1, eight Gaussian basis functions may describe the point cloud. Each of the child nodes may have zero or more child nodes that include mixels that store parameters for other Gaussian basis functions. The tree data structure may have a number of levels that encode the hierarchy for the plurality of mixels.

Each mixel represents a Gaussian basis function which is one component of the PDF that represents the point cloud data. However, a particular mixel only represents a sub-population of the points in the point cloud. The child pixels of the particular mixel represent the sub-population of the points as different sub-populations of the sub-population of the points in the point cloud, and so on and so forth. Thus, each mixel simply defines a location and spatial extent (i.e., probability distribution) within a volume where there is a high probability of enclosing one or more points in the point cloud.

In one embodiment, a GMM hierarchy is initialized by generating a first level of detail of the GMM hierarchy by adding one or more child nodes to the root node of the GMM hierarchy. Each child node may include a mixel that stores parameters for a seeded Gaussian basis function. A Gaussian basis function is seeded by specifying a set of initial parameters for the Gaussian basis function including a mean $\mu$, a covariance matrix $\Sigma$, and a mixing weight $\pi$. The initial parameters may be encoded within the mixels in the first level of detail of the GMM hierarchy. In another embodiment, the parameters encoded within a mixel include a plurality of moments related to the Gaussian basis function.

The mean $\mu$, covariance matrix $\Sigma$, and mixing weight $\pi$ for each Gaussian basis function may then be determined using the encoded moments.

At step 106, the parameters for the mixels are adjusted to fit the point cloud data. In one embodiment, an Expectation-Maximum (EM) algorithm is utilized to adjust the parameters ($\mu$, $\Sigma$, $\pi$) for the seeded Gaussian basis functions. Over a number of iterations of the EM algorithm, the parameters will converge such that the Gaussian basis functions fit the point cloud data as well as possible given the number of Gaussian basis functions. The EM algorithm adjusts the parameters by evaluating a set of expectation values for the model with respect to the point cloud data. The inclusion of a uniform noise distribution function as well as the Gaussian basis functions for representing the set of points adds robustness to the model and prevents outliers in the point cloud data from skewing the results.

At step 108, the adjusted parameters for the mixels are analyzed. The analysis determines whether a particular node should be segmented into one or more child nodes in another level of detail of the GMM hierarchy. For each node in the current branch of the tree in the current level of detail, a shape or complexity of the corresponding Gaussian basis function may be analyzed by, e.g., comparing a determinant of the covariance matrix for the corresponding Gaussian basis function to a threshold value. If the determinant of the covariance matrix is below the threshold value, then the node does not need to be segmented. However, if the determinant of the covariance matrix is above the threshold value, then the node is segmented and one or more child nodes are added to the node. Steps 106 and 108 may be repeated for the new nodes at the next level of detail of the GMM hierarchy.

The EM algorithm utilized in step 106 may be performed, at least in part, in parallel. For example, the E-step of the EM algorithm may be used to calculate a set of expectation values in parallel on a point-level basis (i.e., expectation values are calculated for a plurality of points substantially simultaneously). In addition, the M-step of the EM algorithm can be performed in parallel on a mixel-level basis (i.e., new latent variables for each Gaussian basis function are calculated for a plurality of mixels substantially simultaneously). The parallel processing may be performed on a parallel processing unit such as a GPU.

Figure 1B:
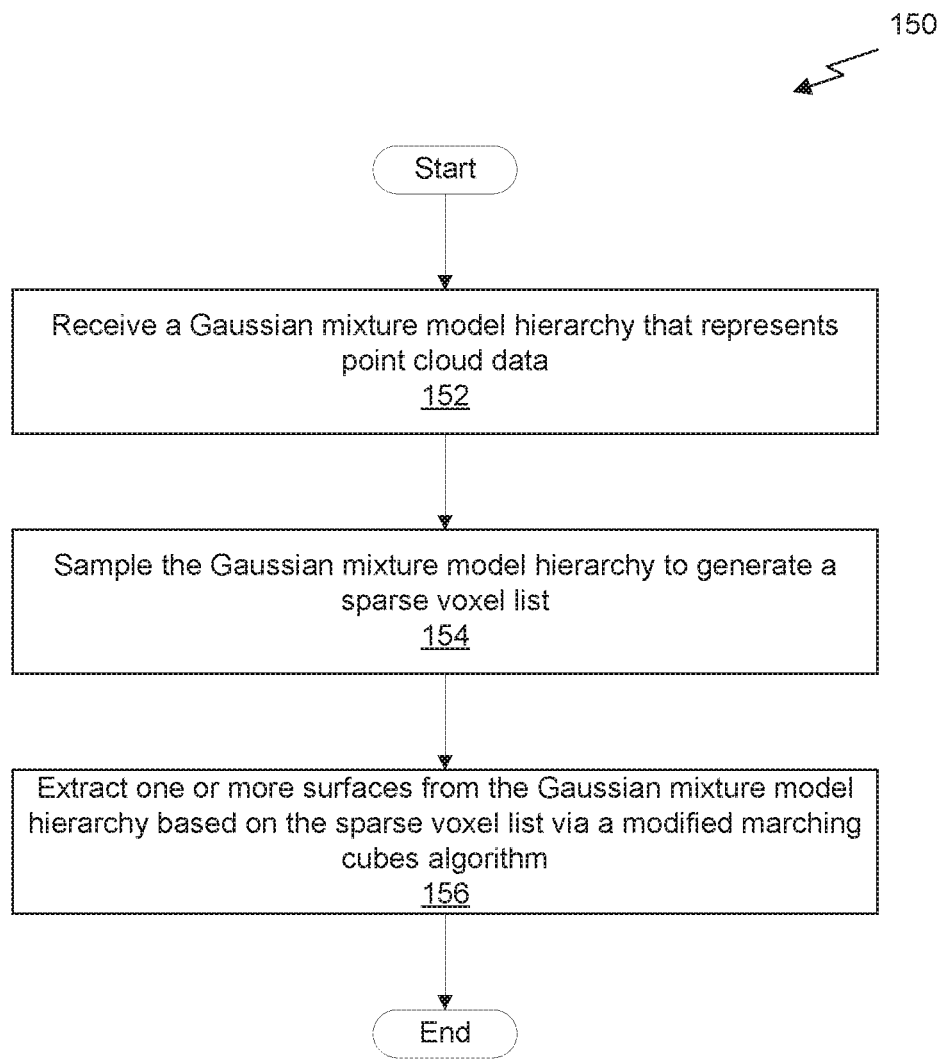
FIG. 1B illustrates a flowchart of a method for extracting iso-surfaces from the hierarchical Gaussian mixture model, in accordance with one embodiment.

FIG. 1B illustrates a flowchart of a method 150 for extracting iso-surfaces from the GMM hierarchy, in accordance with one embodiment. At step 152, a GMM hierarchy is received. The GMM hierarchy may comprise a tree data structure, where each node in the data structure includes a mixel associated with a probabilistic occupancy map (e.g., a Gaussian basis function). Each level of the tree comprises a different level of detail. Each node in the tree encodes parameters for a different probabilistic occupancy map. For example, each node may store the mean $\mu$, covariance matrix $\Sigma$, and mixing weight $\pi$ for a Gaussian basis function. In another example, each node in the tree encodes the parameters as a plurality of moments related to a corresponding Gaussian basis function.

In a traditional marching cubes algorithm, a set of voxels is defined, and then each voxel is tested by sampling the points at the vertices of the voxel (i.e., a rectangular volume) to determine if values for each of the vertices of the voxel cross an iso-value (i.e., at least one vertex is associated with a value below the iso-value and at least one vertex is associated with a value above the iso-value). However, the traditional marching cubes algorithm is inefficient because most surfaces are sparsely distributed within the volume. In other words, a typical model represented by a point cloud will have a significant amount of volume unoccupied by any solid matter or surfaces. Therefore, a modified marching cubes algorithm, described in more detail below, attempts to make the process more efficient by only testing those voxels that are highly likely to lie near an iso-surface boundary. The list of voxels with high probability of being near the iso-surface (i.e., the sparse voxel list) may be generated by sampling each of the mixels included in the GMM hierarchy using a set of transformed samples. Sampling the GMM hierarchy to generate the sparse voxel list is efficient because each Gaussian basis function is limited to a certain spatial extent (i.e., relatively speaking, the probability that any point associated with an iso-surface represented by a particular Gaussian basis function drops below some minimum threshold value at a specific distance from the centroid (mean) of the Gaussian basis function).

At step 154, the GMM hierarchy is sampled to generate a sparse voxel list. In one embodiment, an importance sampling algorithm is utilized to generate the sparse voxel list using a Monte Carlo technique. A set of voxels are defined by constructing a volume associated with the point cloud data and then dividing the volume into discrete voxels based on a voxel resolution. The volume may be related to a viewing frustum for creating an image of the model during rendering. Each mixel of the GMM hierarchy can be sampled to generate a plurality of points, such points being compared to the set of voxels in order to generate a sparse voxel list. Thus, only a small subset of voxels from the entire voxelized volume may be processed during execution of the modified marching cubes algorithm.

At step 156, one or more iso-surfaces are extracted from the GMM hierarchy based on the sparse voxel list via the modified marching cubes algorithm. An iso-surface may be extracted as one or more triangles included within one or more voxels in the sparse voxel list. In the modified marching cubes algorithm, each active voxel in the sparse voxel list may be tested. To test a voxel, a probability value may be calculated for each vertex of the voxel based on the parameters stored in the mixels of the GMM hierarchy. The probability values may be compared to an iso-value to generate a mask for the voxel, where the mask identifies whether the voxel includes one or more pre-determined polygons (i.e., triangles). Accurate locations for the vertices of the one or more polygons may be calculated on the edges of the voxel using interpolation techniques. In this manner, iso-surfaces may be extracted from the GMM hierarchy without having to test each and every voxel defined for a particular volume, thereby saving a significant amount of processing.

In one embodiment, each of the voxels in the sparse voxel list may be processed in parallel. For example, in a first step, all eight probability values for the eight vertices of a voxel may be calculated in parallel by sampling the GMM hierarchy using the corresponding locations for each vertex. Furthermore, probability values for multiple voxels in the sparse voxel list may be calculated substantially simultaneously. In a second step, the set of probability values for each voxel may be compared to an iso-value and a determination made as to whether the voxel encloses, at least in part, an iso-surface. Again, the second step may also be performed in parallel for multiple voxels. The parallel processing may be performed on a parallel processing unit such as a GPU.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
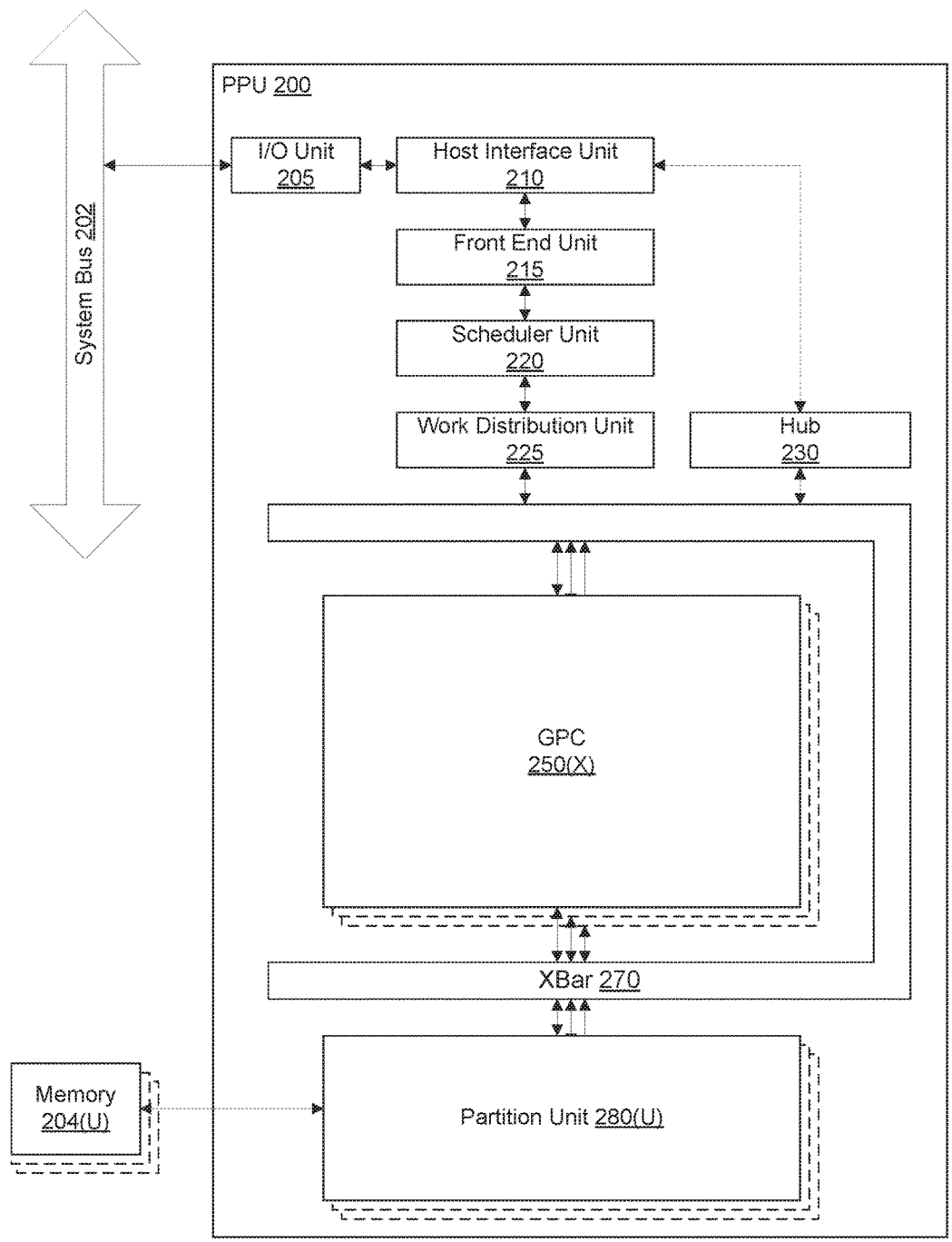
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
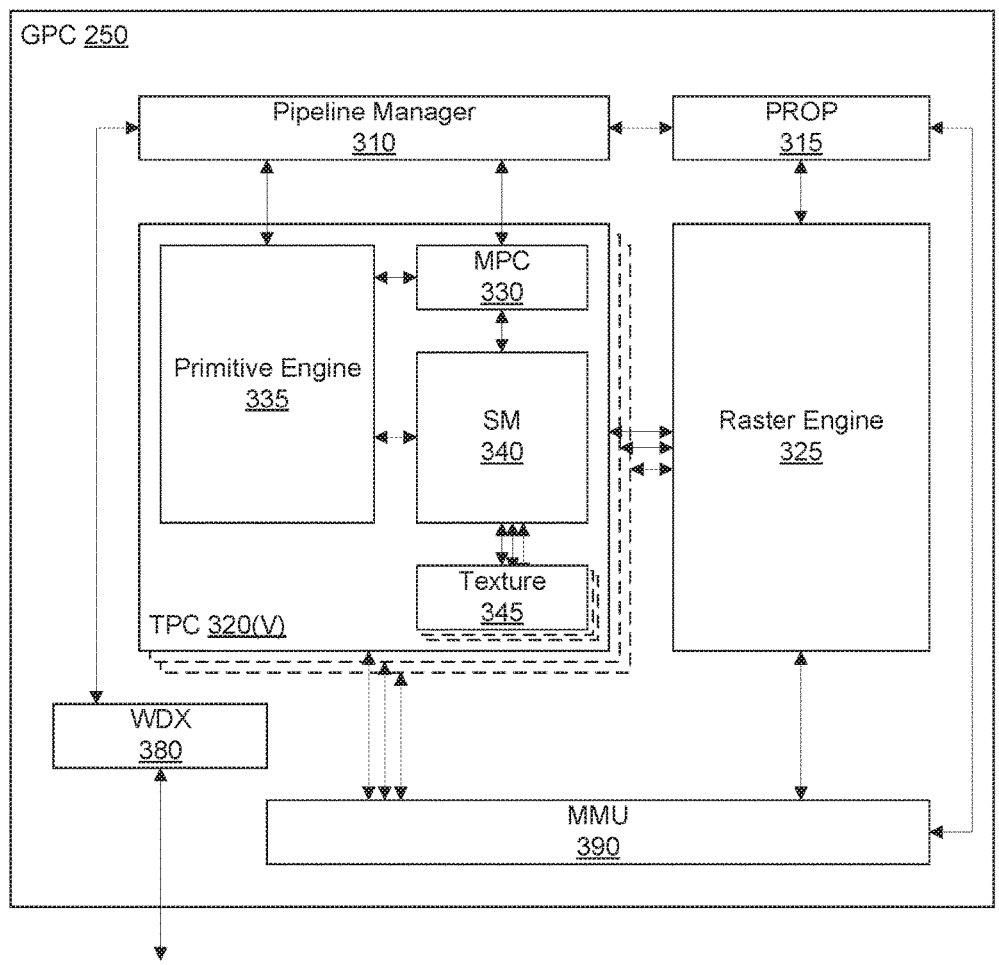
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
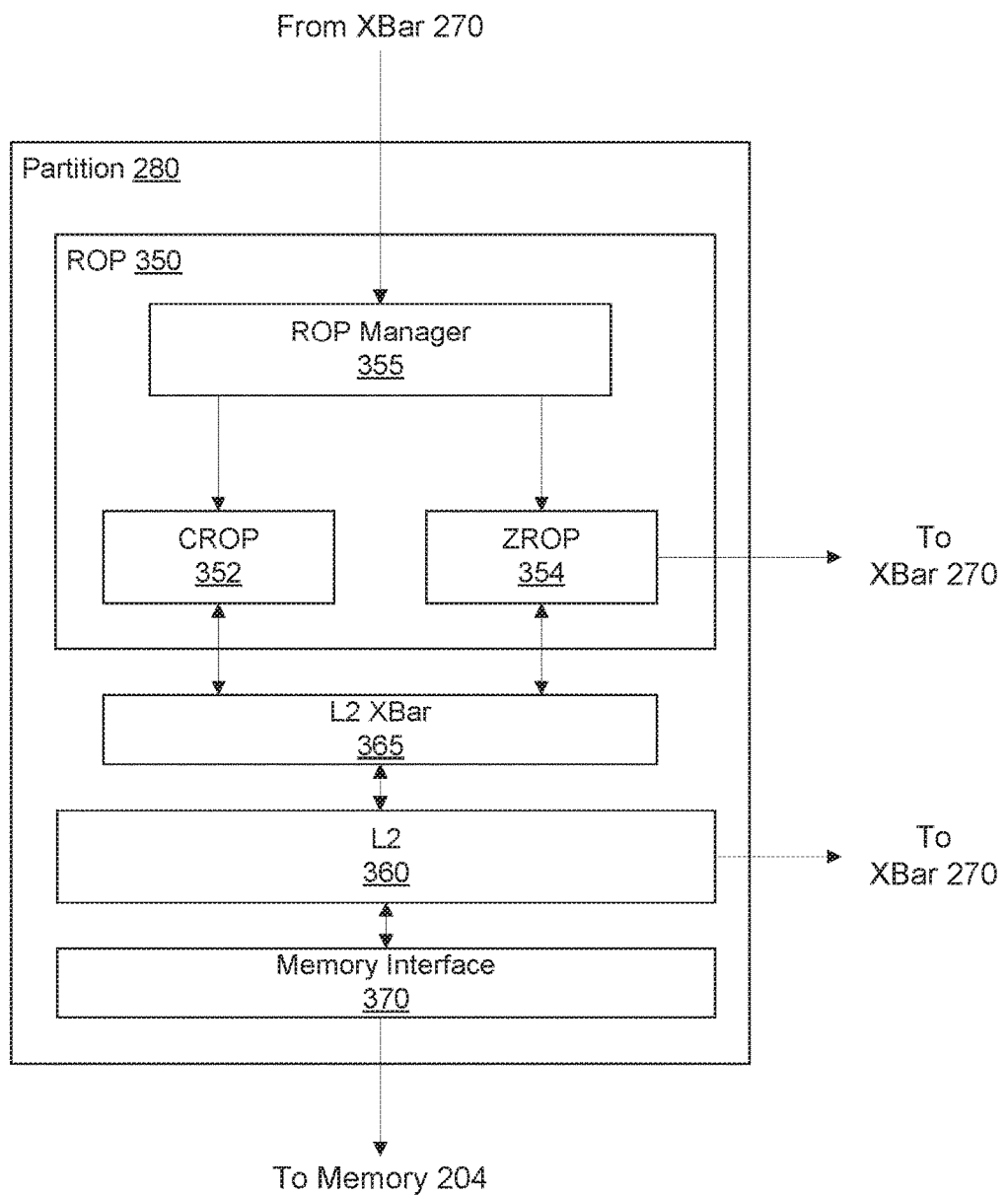
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
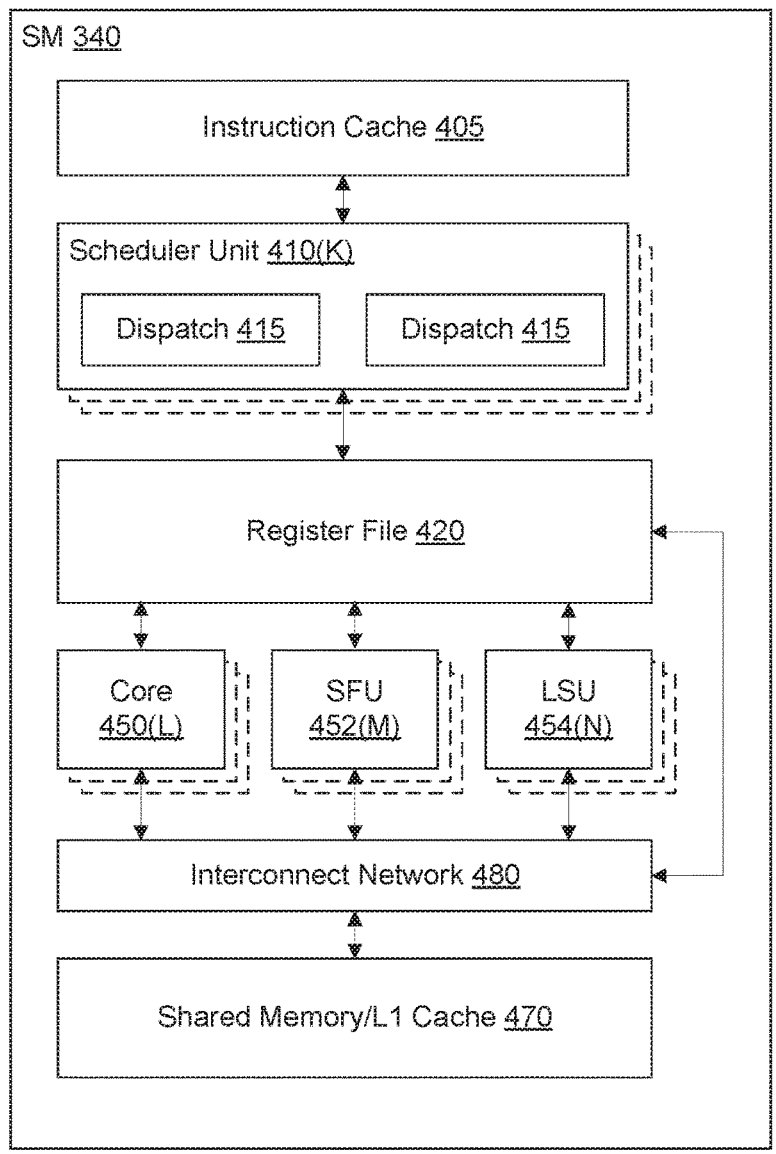
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises A SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
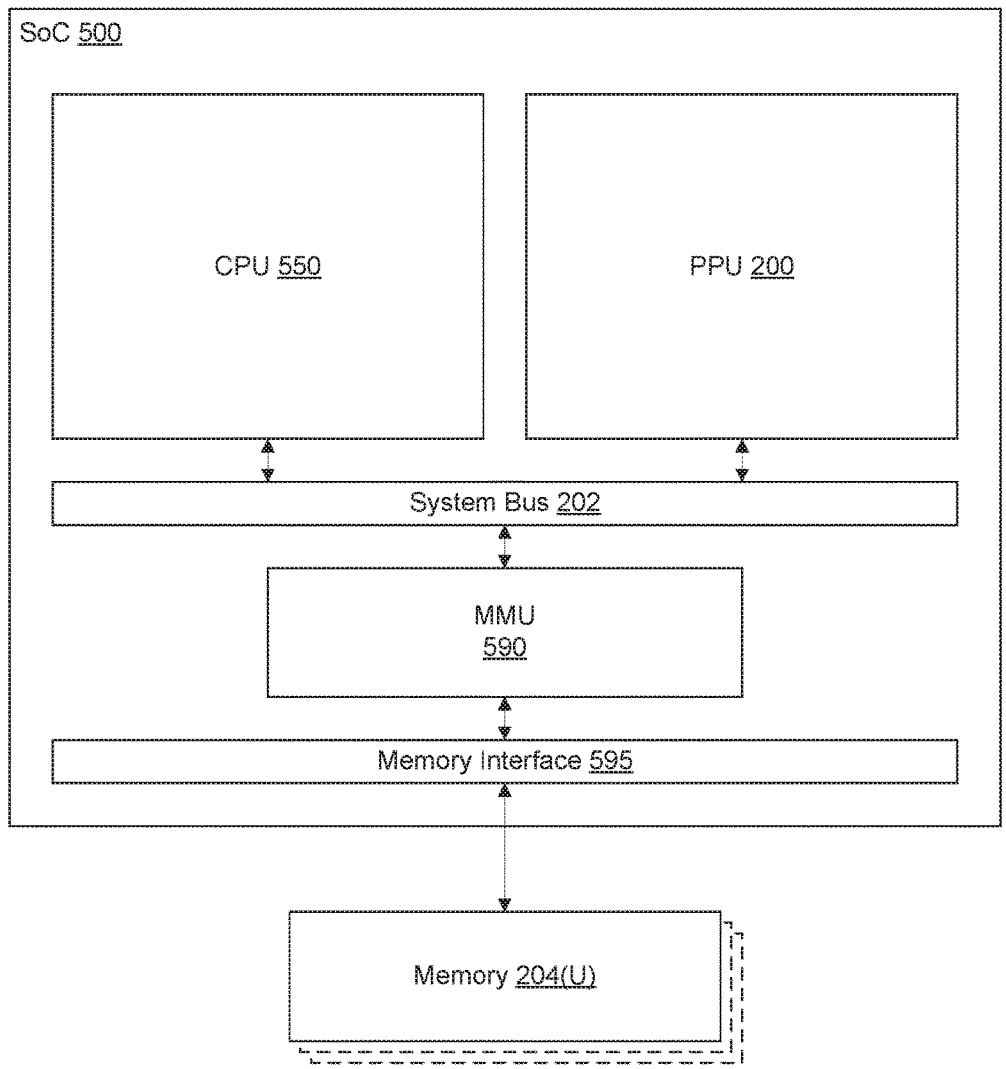
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
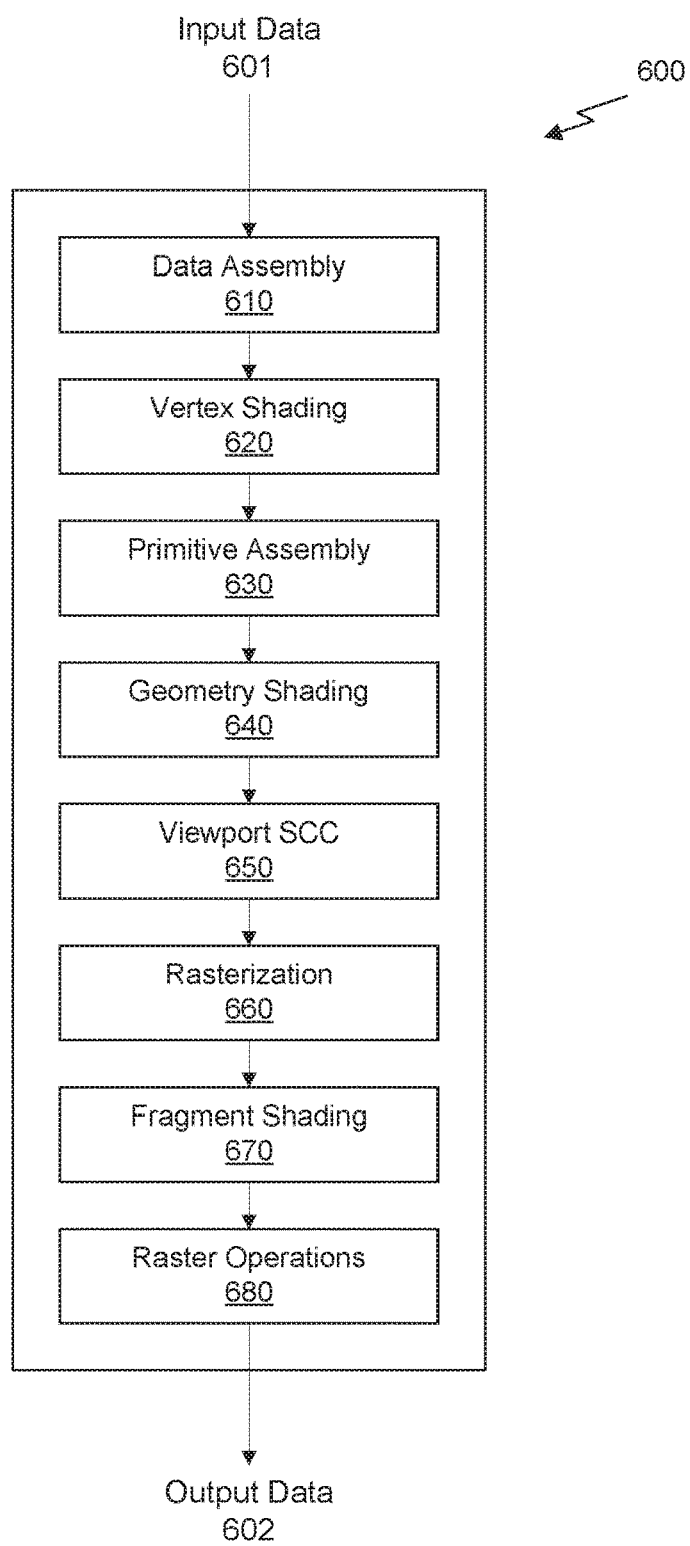
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Hierarchical Gaussian Mixture Models

Figure 7A:
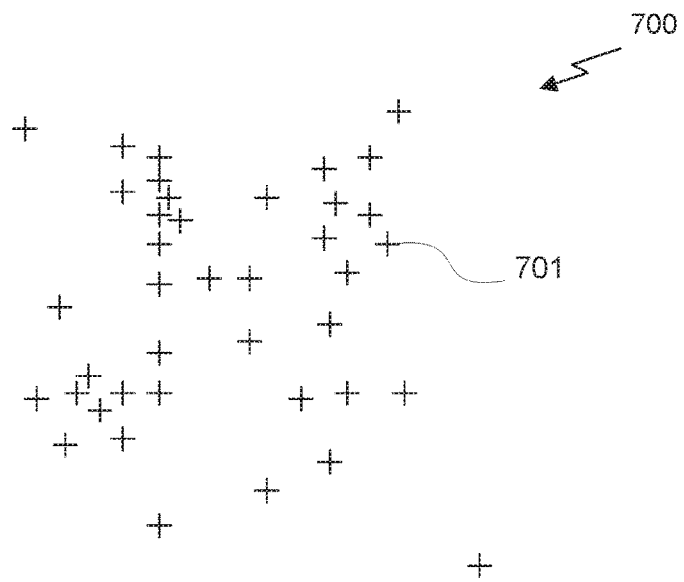
FIG. 7A illustrates point cloud data, in accordance with the prior art.

FIG. 7A illustrates point cloud data, in accordance with the prior art. As shown in FIG. 7A, the point cloud 700 includes a plurality of points, such as point 701. Each point is a three-dimensional point in $\mathbb{R}^3$ having a vector form of $<x, y, z>$. The point cloud 700 may be automatically captured by a conventional range sensor, such as a laser range finder, or any other device capable of capturing point cloud data. Alternatively, the point cloud 700 may be generated based on a virtual model, such as by sampling a computer model using ray tracing techniques. The point cloud 700 may be generated by any means well-known in the art.

Figure 7B:
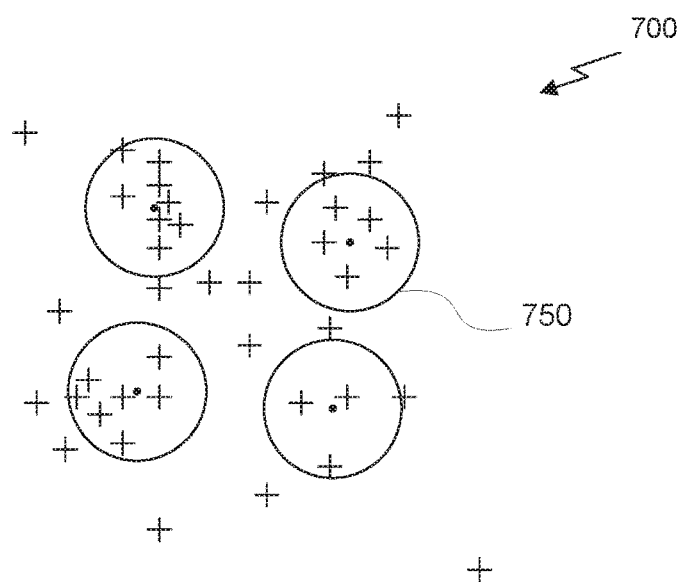
FIG. 7B illustrates a Gaussian mixture model of the point cloud data, in accordance with the prior art.

FIG. 7B illustrates a GMM of the point cloud data, in accordance with the prior art. A GMM is a probabilistic model that assumes all data points in the point cloud 700 may be modeled from a mixture of a finite number of multivariate Gaussian distributions with unknown parameters. A Gaussian distribution (or normal distribution) represents a real-valued, random variable whose distributions are not known. The probability density function (PDF) of the multivariate Gaussian distribution is given by:

$$p(x|\mu, \Sigma) = \frac{1}{(2\pi)^{n/2}|\Sigma|^{1/2}} e^{(-\frac{1}{2}(x-\mu)^T \Sigma^{-1}(x-\mu))}, \quad \text{(Eq. 1)}$$

where n is the number of variables in vector x, p is the mean of the distribution, and $\Sigma$ is a covariance matrix. It will be understood that Equation 1 is a vector equation where $\mu$ is a vector of three scalar values and $\Sigma$ is an n×n matrix of scalar values that represent the variance of each variable in vector x as well as covariances of pairs of variables of vector x. A set of points within a particular cluster may be represented by a single multivariate Gaussian distribution having a specified mean ($\mu$) and covariance ($\Sigma$). Thus, the entire data set in the point cloud 700 may be represented by a number of different Gaussian distributions, with each point belonging to a particular cluster or subset of points represented by one of the Gaussian distributions. In other words, the PDF of the Gaussian distribution represents a measurement of a probability that any random point will be a represented by a particular Gaussian distribution, where the probability is a maximum at a location specified by the mean ($\mu$) associated with the Gaussian distribution and the probability decreases the further the distance, along a particular direction, of the point from the location specified by the mean.

As shown in FIG. 7B, the point cloud 700 may be modeled by assuming that all points 710 in the point cloud belong to one of a number of Gaussian distributions 750 (e.g., 4 Gaussian distributions). The Gaussian distributions 750 are shown as spheres that represent a one-sigma extent of each Gaussian distribution 750. It will be appreciated that each Gaussian distribution 750 may actually have different scalar values of sigma for each variable of x such that an iso-surface representing one sigma is ellipsoidal and not spherical. Furthermore, each sphere in FIG. 7B is shown as the same size although different Gaussian distributions 750 may have different values for sigma such that the spatial extent of the Gaussian distributions 750 is not uniform. The spheres shown in FIG. 7B are for purposes of illustration and do not represent the actual spatial extents of the Gaussian distributions 750.

In one technique employed by the prior art, the point cloud 700 may be represented by multiple, unimodal PDFs of Gaussian distributions, and the points in the point cloud 700 may be recursively divided into separate clusters to assign the points to one of the PDFs in the GMM, where the PDFs are structured as a binary tree of Gaussian distributions and at each node in the binary tree, a particular point will have a higher probability of being associated with one branch over the other branch. The points may be assigned to the PDFs using recursive binary splits of the points using k-means clustering and then performing PCA (principal component analysis) independently on each cluster until a certain stopping criteria is reached. For example, the stopping criteria may be reached once all of the PDFs fit the various clusters such that the determinant of the covariance matrix for each PDF is below a particular threshold value. If the determinant of the covariance matrix of any PDF is too high, then another level of the GMM may be added to further subdivide the points in that cluster into two different subsets of points associated with two new PDFs. Alternatively, the stopping criteria may be related to the variance for each variable, such that if the variance for any one variable is above the threshold value, then another level of the GMM may be added to further subdivide the points in that cluster into two different subsets of points associated with two new PDFs.

For example, the algorithm might begin by using a k-means clustering algorithm to split the points in the point cloud into two clusters. Once the clusters have been determined, a PDF is defined for each of the clusters that fits all of the points in that particular cluster. For example, a PDF may be defined that has a mean based on the centroid of the points assigned to that cluster and a covariance matrix calculated based on the difference between each point and the location of the centroid of the points assigned to that cluster. If the determinant of the covariance matrix for each PDF is below a threshold value, then the algorithm is stopped and the number of PDFs represents the point cloud. However, if the determinant of the covariance matrix for each PDF is above the threshold value, then each of the clusters is split into two separate sub-clusters using the k-means clustering algorithm and the process is recursively repeated.

The implementation described above suffers from some drawbacks. First, there could potentially be tree imbalance issues where points are dense with respect to one set of PDFs on one side of the tree and sparse with respect to another set of PDFs on another side of the tree. Further, having a number of different PDFs representing different clusters of different point densities makes it difficult to recreate the point cloud by sampling the model.

Figure 8A:
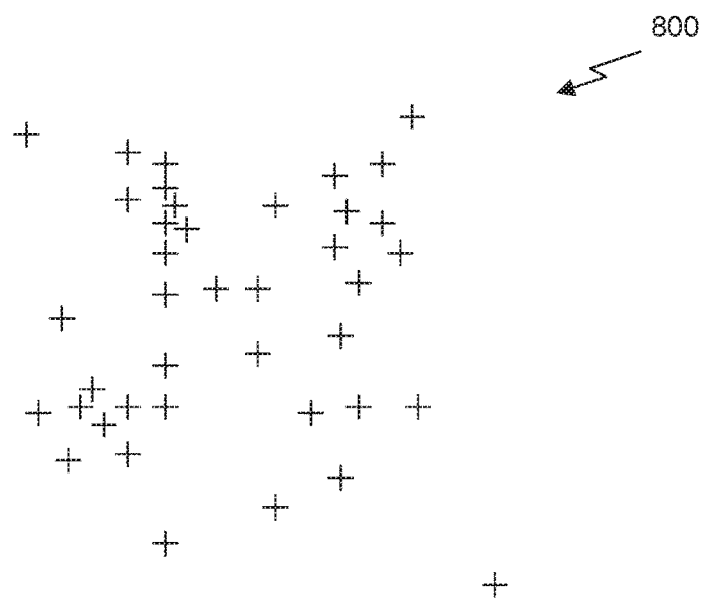
FIGS. 8A-8D illustrate a technique for generating a Gaussian mixture model hierarchy for point cloud data, in accordance with one embodiment.

FIGS. 8A-8D illustrate a technique for generating a GMM hierarchy for point cloud data, in accordance with one embodiment. As shown in FIG. 8A, a point cloud 800 is captured or received via any conventional means. The point cloud 800 may be stored in memory, such as a non-volatile memory (e.g., a hard disk drive, optical drive, solid state drive, etc.). The technique for representing the point cloud 800, described herein, is to represent the point cloud 800 as a set of anisotropic basis functions (e.g., Gaussian basis functions) stored as mixels in a tree data structure. The mixels are arranged in a hierarchy, with each mixel representing a sub-surface patch modeled by the point cloud 800. A sub-surface path refers to an overlapping, probabilistic occupancy map that represents at least a portion of the model. The mixels associated with child nodes, therefore, represent different, smaller components of the sub-surface patch represented by the mixel associated with a parent node of the child nodes. As the number of levels of the GMM hierarchy increases, the mixels at the highest levels of detail represent smaller and smaller sub-surface patches.

The GMM hierarchy may be encoded in a tree data structure, with each node of the tree data structure including a mixel that stores parameters associated with a particular Gaussian basis function. In addition, the GMM hierarchy may be generated using a uniform noise distribution function that adds robustness to the model compared to conventional techniques and represents a small probability that any point in the point cloud is not associated with any Gaussian basis functions, but instead represents noise in the signal captured in the point cloud 800. The model of the point cloud 800 can be generated in a data-parallel fashion by recursively employing the Expectation-Maximization (EM) algorithm over soft subdivisions of the point data. The term "soft subdivisions" is used herein to refer to a division of the points such that any given point may fit more than one Gaussian basis function. In contrast, a "hard subdivision" of the data requires each point to be assigned to a single Gaussian basis function.

The Gaussian basis functions model various sub-surface patches and the uniform noise distribution function adds robustness to the model by preventing outliers from skewing the results. In other words, while most points in the point cloud will have a strong correlation with one or more sub-surface patches represented by the corresponding Gaussian basis functions, some points may not be well represented by the model and are therefore associated with a noise distribution so as not to skew the model based on these outlier points. Sources of the noise could be generated by noise in the sensing technology or could be based on small surfaces in relation to the rest of the scene represented by the point cloud.

In this approach, the underlying model is composed of overlapping probabilistic occupancy maps, $\Theta$, that represent a set of N point samples, $\mathcal{Z}$. Each mixel in the GMM hierarchy encodes parameters for a different probabilistic occupancy map. A set of latent variables C represent the associations between the point samples $\mathcal{Z}$ and probabilistic occupancy maps $\Theta$. The set of probabilistic occupancy maps $\Theta$ is broken down into J probabilistic occupancy maps $\Theta_j$ represented by Gaussian basis functions and a special $J+1^{th}$ probabilistic occupancy map represented by a uniform noise distribution. Each of the J probabilistic occupancy maps $\Theta_j$ is represented by a three-dimensional (3D) multivariate Gaussian basis function ($\Theta_j = \{\mu_j, \Sigma_j, \pi_j\}$), as illustrated in Equation 1. The $J+1^{th}$ probabilistic occupancy map is a function with constant probability value over the volume associated with the point cloud data. In other words, any point within the point cloud data has a constant, small probability of being noise and not being associated with any particular probabilistic occupancy map. However, most points will have a higher probability of being associated with at least one of the probabilistic occupancy map associated with one of the Gaussian basis functions than a probability of being noise. In other words, for each point in the point cloud, $z_i \in \mathcal{Z}$, a probability density function is defined as:

$$p(z_i|\Theta) = \Sigma_{j=1}^{J+1} \pi_j p(z_i|\Theta_j) \qquad \text{(Eq. 2)}$$

where $p(z_i|\Theta_{J+1}) = \epsilon$, $\epsilon$ is a constant value over the volume associated with the point cloud, and $\pi_j$ represents a set of mixing weights that satisfy the equation:

$$\Sigma_{j=1}^{J+1} \pi_j = 1 \qquad \text{(Eq. 3)}$$

For each $z$-$\Theta$ pair, there is an associated binary correspondence $c_{ij}$ in $\mathcal{C}$. If a hard subdivision of the point data is implemented, then for a particular point $z_i$, $c_{ij}=1$ for exactly one probabilistic occupancy map and $c_{ij}=0$ for all other probabilistic occupancy maps. The marginal probability of a point cloud, given that each point sample is an independent and identically distributed random variable, is given as:

$$p(\mathcal{Z}|\Theta) = \Pi_{i=1}^{N} p(z_i|\Theta) = \Pi_{i=1}^{N} \Sigma_{j=1}^{J+1} \pi_j p(z_i|\Theta_j) \qquad \text{(Eq. 4)}$$

Equation 4 indicates the data likelihood of the model. Transforming Equation 4 into the data log-likelihood of the model (i.e., taking the natural logarithm of both sides of the equation) results in an unsolvable equation, analytically, since Equation 4 includes a sum inside the logarithm. A joint probability of the points $\mathcal{Z}$ and correspondences $\mathcal{C}$ may be used instead of the marginal probability to arrive at the data log-likelihood of the model, as shown in Equation 5. The restriction of the correspondences $\mathcal{C}$ makes the inner sum disappear.

$$\ln p(\mathcal{Z}, \mathcal{C} | \Theta) = \Sigma_{ij} c_{ij} \{\ln \pi_j + \ln p(z_i | \Theta_j)\} \quad \text{(Eq. 5)}$$

However, because the latent variables $\mathcal{C}$ for the probabilistic occupancy maps are unknown, Equation 5 is still unsolvable analytically. Thus algorithm may be utilized to arrive at a set of latent variables $\mathcal{C}$ that may be used to solve Equation 5.

First, an initial set of probabilistic occupancy maps for a $k^{th}$ iteration of the EM algorithm, $\Theta_j^k$, is seeded by defining the parameters for the set of probabilistic occupancy maps. The parameters of the probabilistic occupancy maps (i.e., $\mu$, $\Sigma$, $\pi$) may be set arbitrarily as the EM algorithm will eventually converge on a set of latent variables that best fit the point cloud data based on the defined set of probabilistic occupancy maps. In the E-step, a set of expectation values is calculated based on the initial set of probabilistic occupancy maps according to Equation 6:

$$E[c_{ij}] = \frac{\pi_j N(Z_i | \Theta_j)}{\sum_{j'=1}^{J} \pi_{j'} p(Z_i | \Theta_{j'}) + \frac{\pi_{J+1}}{\eta}}, \quad \text{(Eq. 6)}$$

where $\eta$ is the volume of a bounding box for which the uniform noise distribution function is active, $N(z_i|\Theta_j)$ is a PDF of the normal distribution for a particular probabilistic occupancy map $\Theta_j$ and a particular point $z_i$, and $\pi_{J+1}$ represents a static mixing weight for the noise distribution (e.g., if $\pi_{J+1}$ is set equal to 0.02 then there is an expectation a priori that 2% of the points in the point cloud represent noise). The set of solutions to Equation 6 is referred to herein as the set of expectations, and may be referred to as the variable gamma ($E[c_{ij}] \equiv \gamma_{ij}$). Equation 6 represents a soft division of the point cloud data since the expectation values for the latent variables are not restricted to the set of zero and one ($E[c_{ij}] = \{0,1\}$), but instead fall within the range of zero to one ($E[c_{ij}] = [0,1]$). In the M-step, the expected log-likelihood is maximized with respect to $\Theta_j^k$ using the set of expectation values found in the E-step:

$$\max_{\Theta_j} \Sigma_{ij} \gamma_{ij} \{\ln \pi_j + \ln p(z_i | \Theta_j)\} \quad \text{(Eq. 7)}$$

Given the set of expectations calculated in the E-step, the optimal parameters for each probabilistic occupancy map ($\mu$, $\Sigma$, $\pi$) in a new set of probabilistic occupancy maps for a $k+1^{th}$ iteration of the EM algorithm, $\Theta_j^{k+1}$, may be calculated as follows:

$$\mu_j^{k+1} = \frac{\Sigma_i \gamma_{ij} z_i}{\Sigma_i \gamma_{ij}} \quad \text{(Eq. 8)}$$

$$\Sigma_j^{k+1} = \frac{\Sigma_i \gamma_{ij}(z_i - \mu_j^{k+1})(z_i - \mu_j^{k+1})^T}{\Sigma_i \gamma_{ij}} \quad \text{(Eq. 9)}$$

$$\pi_j^{k+1} = \Sigma_i \frac{\gamma_{ij}}{N}, \quad \text{(Eq. 10)}$$

where $\mu_j^{k+1}$ are the mean values associated with the probabilistic occupancy maps for the $k+1^{th}$ iteration of the EM algorithm, $\Sigma_j^{k+1}$ are the covariance matrices associated with the probabilistic occupancy maps for the $k+1^{th}$ iteration of the EM algorithm, and $\pi_j^{k+1}$ are the mixing weights associated with the probabilistic occupancy maps for the $k+1^{th}$ iteration of the EM algorithm. The set of probabilistic occupancy maps for the $k+1^{th}$ iteration of the EM algorithm may be used as the initial set of probabilistic occupancy maps in another iteration of the EM algorithm to refine the set of probabilistic occupancy maps to more accurately represent the point cloud.

It will be appreciated that after a number of iterations of the EM algorithm, the results of Equations 8, 9, and 10 will converge (i.e., the parameters associated with the set of J probabilistic occupancy maps will not change significantly between iterations), and the EM algorithm may be terminated such that the parameters associated with the J probabilistic occupancy maps are defined for the model based on the results of Equations 8, 9, and 10 calculated during the last iteration of the EM algorithm. In one embodiment, the EM algorithm may be iterated indefinitely until stopping criteria are met (i.e., where a change between iterations is determined to be below a threshold). In another embodiment, the EM algorithm may be iterated a fixed number of times before being terminated (e.g., the number of iterations may be fixed at 8 iterations).

Once the EM algorithm has been terminated, the set of probabilistic occupancy maps encoded by the GMM hierarchy may be analyzed. For example, each probabilistic occupancy map may be analyzed and, if the shape associated with the represented Gaussian basis function is significantly complex, then the nodes of the tree may be recursively segmented to add new mixels to the tree at higher levels of detail. In other words, a number of mixels in the tree may be increased by segmenting a particular node of the tree to add k child nodes at another level of the tree. The k child nodes may encode mixels that include parameters for new probabilistic occupancy maps seeded in another execution of the EM algorithm.

In one embodiment, a geometric complexity parameter is defined that provides a threshold value to determine whether any probabilistic occupancy map is too complex and, therefore, whether additional nodes should be added to the GMM hierarchy. For each probabilistic occupancy map, $\Theta_j$, the determinant of the covariance matrix, $|\Sigma_j|$, is compared to the threshold set by the geometric complexity parameter, and if the determinant of the covariance matrix is below the threshold, then no additional nodes are added to the tree. However, if the determinant of the covariance matrix is above the threshold, then new child nodes are added to the tree under the node associated with the probabilistic occupancy map.

In another embodiment, if a probabilistic occupancy map is associated with a number of points over a threshold number of points, then the node of the tree may be segmented into a number of child nodes. For example, the number of points in the point cloud associated with a probability value above an iso-value may be counted and, if the number of points having a probability above the iso-value is above the threshold value, then the node of the tree may be segmented into a number of child nodes.

In yet another embodiment, a "flatness" of the probabilistic occupancy map is determined. "Flatness" refers to a ratio of eigenvalues associated with the minimum and maximum eigenvector of the covariance matrix for the probabilistic occupancy map. The "flatness" is a heuristic for how close the covariance matrix for the probabilistic occupancy map is to being degenerate (i.e., having an eigenvalue of zero) in at least one dimension. This heuristic works since solid surfaces generally look planar, locally, when inspected closely enough. Therefore, if the points associated with a surface are sufficiently planar (or linear), then segmenting the node into child nodes to increase a number of probabilistic occupancy maps will not lead to an increase in detail of the model.

In yet another embodiment, the nodes of the tree may be segmented until the level of detail of the GMM hierarchy reaches a particular level. In other words, the tree representing the GMM hierarchy may be filled, in all branches, up to a certain level. Such embodiments may prevent significant divergence of an algorithm implemented on particular hardware architectures.

Figure 8B:
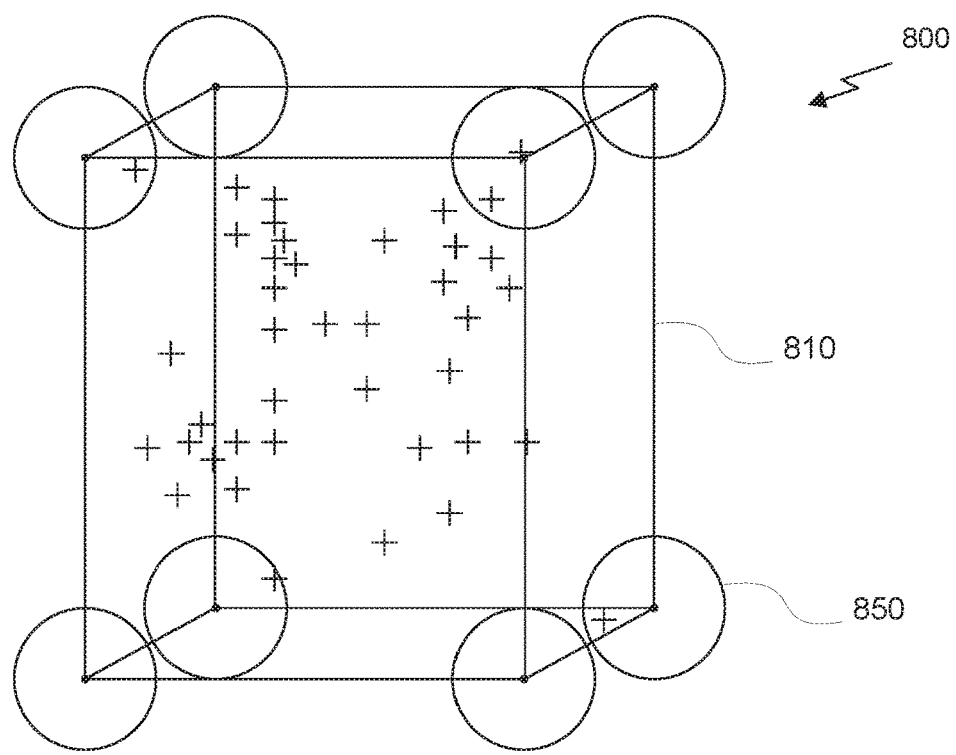

In one embodiment, as shown in FIG. 8B, the technique begins by defining a bounding box 810 that encloses all points in the point cloud 800. The GMM hierarchy is initialized with a number of nodes in a first level of the GMM hierarchy, each node in the first level including a mixel that represents a probabilistic occupancy map. The mixels are seeded to begin the first iteration of the EM algorithm by populating the parameters encoded by the mixels based on the vertices of the bounding box 810. In one embodiment, eight mixels are created in a first level of the GMM hierarchy to represent eight probabilistic occupancy maps. The eight probabilistic occupancy maps are seeded with mean parameters that correspond to the vertices of the bounding box 810. In other words, the mean $\mu$ of each probabilistic occupancy map is set equal to a location of one of the vertices of the bounding box 810. The covariance matrix $\Sigma$ for each probabilistic occupancy map may be set based on a size of the bounding box 810. For example, the covariance matrix $\Sigma$ may be selected such that the probability of a point located at the center of the bounding box 810 is equal to a particular value. For example, the variance associated with each dimension may be chosen such that the span of the bounding box in that particular dimension is equal to a number (e.g., 1, 3, 6, etc.) of standard deviations.

In another embodiment, the covariance matrix $\Sigma$ for each probabilistic occupancy map may be set based on the points in the point cloud 800. For example, the eight probabilistic occupancy maps may have a common covariance matrix $\Sigma$ calculated based on the distribution of the points in the point cloud 800 using a mean $\mu$ calculated from all the points in the point cloud 800. It will be appreciated that the covariance matrix $\Sigma$ for each probabilistic occupancy map will be corrected in later iterations of the EM algorithm based on the points in the point cloud 800, and that the seeded parameters of the covariance matrix $\Sigma$ for each probabilistic occupancy map is not critical during the first iteration of the EM algorithm. The seeded probabilistic occupancy maps are combined with a uniform noise distribution function to define a set of J probabilistic occupancy maps, $\Theta_j$.

Figure 8C:
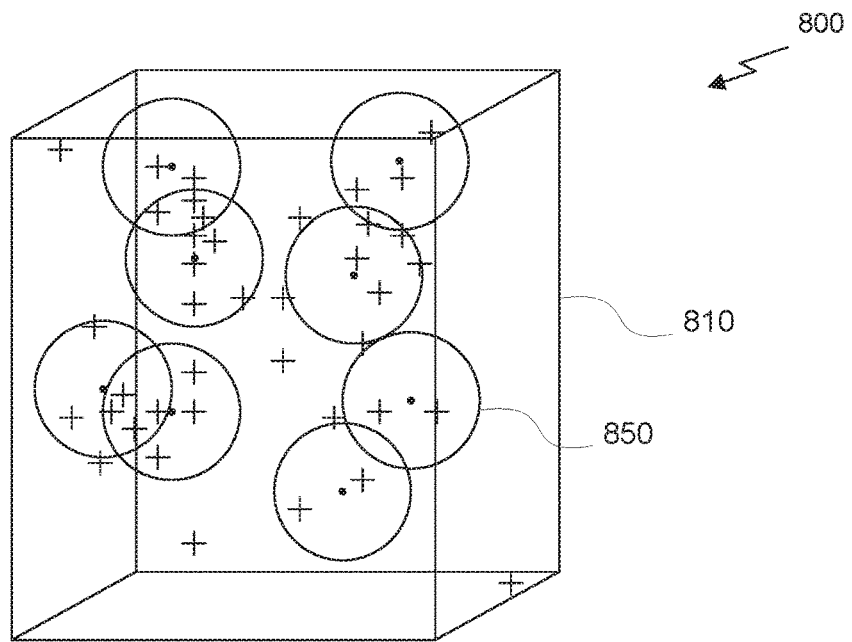

Once the set of probabilistic occupancy maps has been seeded, the EM algorithm is executed to maximize the expected log-likelihood with respect to the set of probabilistic occupancy maps. In other words, a set of expectation values, $\gamma_{ij}$, are calculated based on Equation 6 and the initial set of seeded probabilistic occupancy maps. These expectation values are then used to generate a new set of parameters for the probabilistic occupancy maps ($\mu_j$, $\Sigma_j$, $\pi_j$) according to Equations 8, 9, and 10. A number of iterations of the EM algorithm may be performed until the parameters for the set of probabilistic occupancy maps converge. As shown in FIG. 8C, the EM algorithm fits the probabilistic occupancy maps $\Theta$ to the point cloud 800, where some of the points in the point cloud 800 may be outliers that are better associated with the noise distribution function.

After the EM algorithm has been completed and the set of probabilistic occupancy maps are defined, a refinement step may be performed that analyzes each of the probabilistic occupancy maps to determine if any nodes of the tree should be segmented to add a number of child nodes at a higher level of detail in the GMM hierarchy. In other words, a single probabilistic occupancy map that represents a sub-surface patch may be better represented by a plurality of probabilistic occupancy maps representing a plurality of sub-surface patches at a higher level of detail. In one embodiment, the total expectation, $\Sigma_i \gamma_{ij}$, for a probabilistic occupancy map $\Theta_j$ may be analyzed, as calculated during the last iteration of the EM algorithm, and compared against a threshold value. If the total expectation is above the threshold value, then the node associated with that probabilistic occupancy map may be divided into a number of child nodes at a new level of the GMM hierarchy. The child nodes may include new mixels that may be seeded, during a subsequent iteration of the EM algorithm, according to a skewed version of the bounding box 810. For example, a new bounding box may be defined that encloses all points in the point cloud associated with a probability above a particular iso-value for the probabilistic occupancy map associated with the parent node that is being segmented in the GMM hierarchy. In another example, the skewed bounding box may be a scaled version of a parent level bounding box 810 that is centered on the mean associated with the probabilistic occupancy map for the parent node.

Figure 8D:
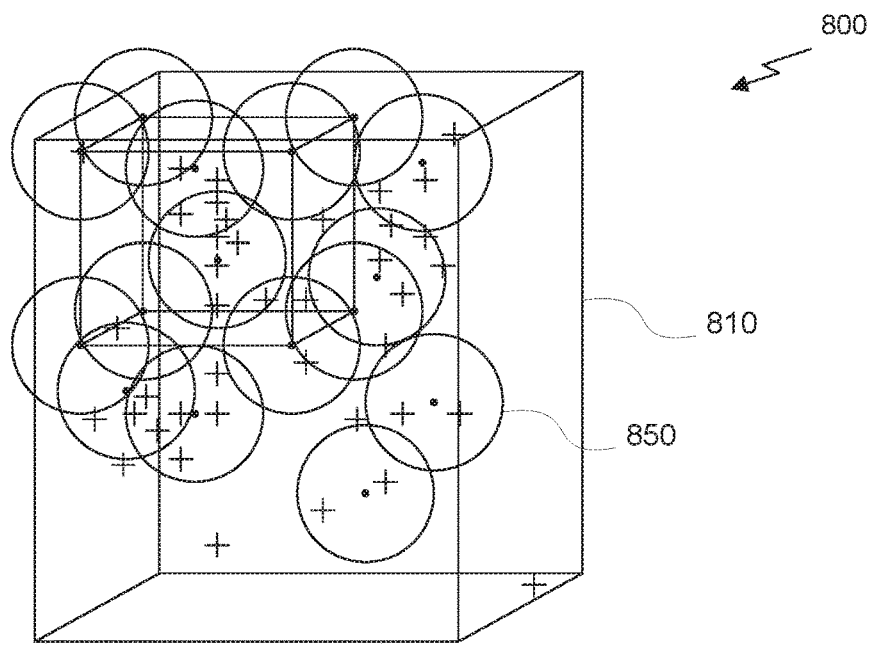

As shown in FIG. 8D, the new set of mixels may be populated with new parameters for a set of probabilistic occupancy maps and the EM algorithm may be used to refine the new set of probabilistic occupancy map encoded within the child nodes. In order to calculate a probability value for a particular point $z_i$, the GMM hierarchy may be sampled based on the location of the point $z_i$. The process begins by calculating a probability value for the point at a root node of the tree. The probability value for a point at the root node is 1 (i.e., 100%) because the root node does not represent one of the J probabilistic occupancy maps, but instead represents the idea that all points in the model are represented by the GMM hierarchy, even if those points are associated with the uniform noise distribution. The probability value for the root node is then multiplied by the sum of probability values for each child node of the root node. Thus, the probability value for the root node is simply the sum of the probability values for each of the child nodes of the root node.

The probability value for a child node may be calculated simply by applying the location of the point $z_i$ as x in Equation 1 and using the mean $\mu_j$ and covariance matrix $\Sigma_j$ for the corresponding probabilistic occupancy map to calculate the probability value for the point $z_i$. The process may be recursively repeated for that node if the node also has child nodes at higher levels of detail. So, once a probability value has been calculated for a parent node, that probability value may be multiplied by the sum of probability values for the child nodes of the parent node. This process may be repeated recursively throughout the tree until a child node is a leaf node that does not have any additional child nodes. Once the total probability value for all probabilistic occupancy maps in the GMM hierarchy has been calculated, then the probability associated with the uniform noise distribution may be added to the result.

Over successive iterations of the EM algorithm, parameters for the probabilistic occupancy maps of the parent nodes will not change as only the parameters for the new probabilistic occupancy maps will need to be updated. Thus, probability values for each point for each probabilistic occupancy map may be stored when the EM algorithm is terminated and such probability values may be reused in subsequent executions of the EM algorithm when refining new probabilistic occupancy maps at new levels of detail in the GMM hierarchy.

It will be appreciated that the total point cloud is used to refine the new set of probabilistic occupancy maps. In prior art implementations, the points in the point cloud are divided into different clusters assigned to the different branches of the GMM hierarchy such that the PDFs in lower levels of the tree are only calculated based on the cluster of points assigned to that branch of the tree. In contrast, the present technique refines the set of probabilistic occupancy maps based on all the points in the point cloud. In other words, the parameters for the probabilistic occupancy maps are adjusted using the EM algorithm based on the contributions from all points in the point cloud 800 due to the nature of the soft division of points between two or more probabilistic occupancy maps. As a result, the model is more robust as points are less likely to be associated with the wrong probabilistic occupancy map based on an incorrect classification at a higher level of the GMM hierarchy.

Once the new set of probabilistic occupancy maps has been refined, the probabilistic occupancy maps are again analyzed and determinations are made as to whether additional levels of detail need to be added to the GMM hierarchy. In this manner, the hierarchical structure of the model is generated dynamically in response to an analysis of how well the current set of probabilistic occupancy maps fits the point cloud 800. Although not shown explicitly, it will be appreciated that all points have some threshold probability of being outliers and, therefore, associated with the uniform noise distribution function rather than one of the J probabilistic occupancy maps included in the GMM hierarchy.

In the embodiment illustrated by FIGS. 8A through 8D, the model is constructed as a tree having eight nodes per parent node, with each node being associated with a probabilistic occupancy map. Each mixel in a node encodes parameters associated with a corresponding probabilistic occupancy map. One particularly effective encoding scheme is to encode a set of weighted moments. Equations 11, 12, and 13 give the second moment, first moment, and zeroth moment for a particular probabilistic occupancy map:

$$\Sigma_i \gamma_{ij} z_i z_i^T \quad \text{(Eq. 11)}$$

$$\Sigma_i \gamma_{ij} z_i \quad \text{(Eq. 12)}$$

$$\Sigma_i \gamma_{ij} \quad \text{(Eq. 13)}$$

The second moment (Eq. 11) may be encoded with six parameters (since the resulting matrix is symmetric), the first moment (Eq. 12) may be encoded with three parameters, and the zeroth moment (Eq. 13) may be encoded with one parameter. It will be appreciated that Equation 9 can be rewritten as:

$$\Sigma_j^{k+1} = \frac{\Sigma_i \gamma_{ij} z_i z_i^T}{\Sigma_i \gamma_{ij}} - \mu_j^{k+1} \mu_j^{k+1T} \quad \text{(Eq. 14)}$$

As such, each of the parameters for the probabilistic occupancy map ($\mu$, $\Sigma$, $\pi$) can be expressed as various combinations of the moments shown in Equations 11, 12, and 13. Thus, the GMM hierarchy can represent the point cloud 800 with 10 values per probabilistic occupancy map rather than 3 values per point (in three dimensions). Usually, the number of probabilistic occupancy maps is much smaller than the number of points in the point cloud 800 and, therefore, the data structure for the GMM representation is significantly smaller than the data structure for the point cloud 800.

In one embodiment, the calculation of the above quantities can be performed in parallel using two steps. In the first step, expectation values $\gamma_{ij}$ can be calculated for each point in parallel corresponding to each probabilistic occupancy map. In other words, a number of threads may be allocated in a parallel processor, such as PPU 200, where each thread corresponds to a particular probabilistic occupancy map in the J probabilistic occupancy maps included in the GMM hierarchy. Then, each point in the point cloud 800 may be processed by the number of threads in parallel, with each thread producing a different expectation value for the point corresponding to the probabilistic occupancy map associated with that thread. In the second step, the weighted sums of Equations 11, 12, and 13 for each probabilistic occupancy map may be calculated utilizing the expectation values calculated in the first step. The first step requires information about all J probabilistic occupancy maps but does not require information about all N points. The second step only requires the results from the first step for the N points, but does not require information about the J probabilistic occupancy maps. Thus, Equations 11, 12, and 13 may be solved for the different probabilistic occupancy maps, completely independently and in parallel, once the results of the first step are known.

Figure 9:
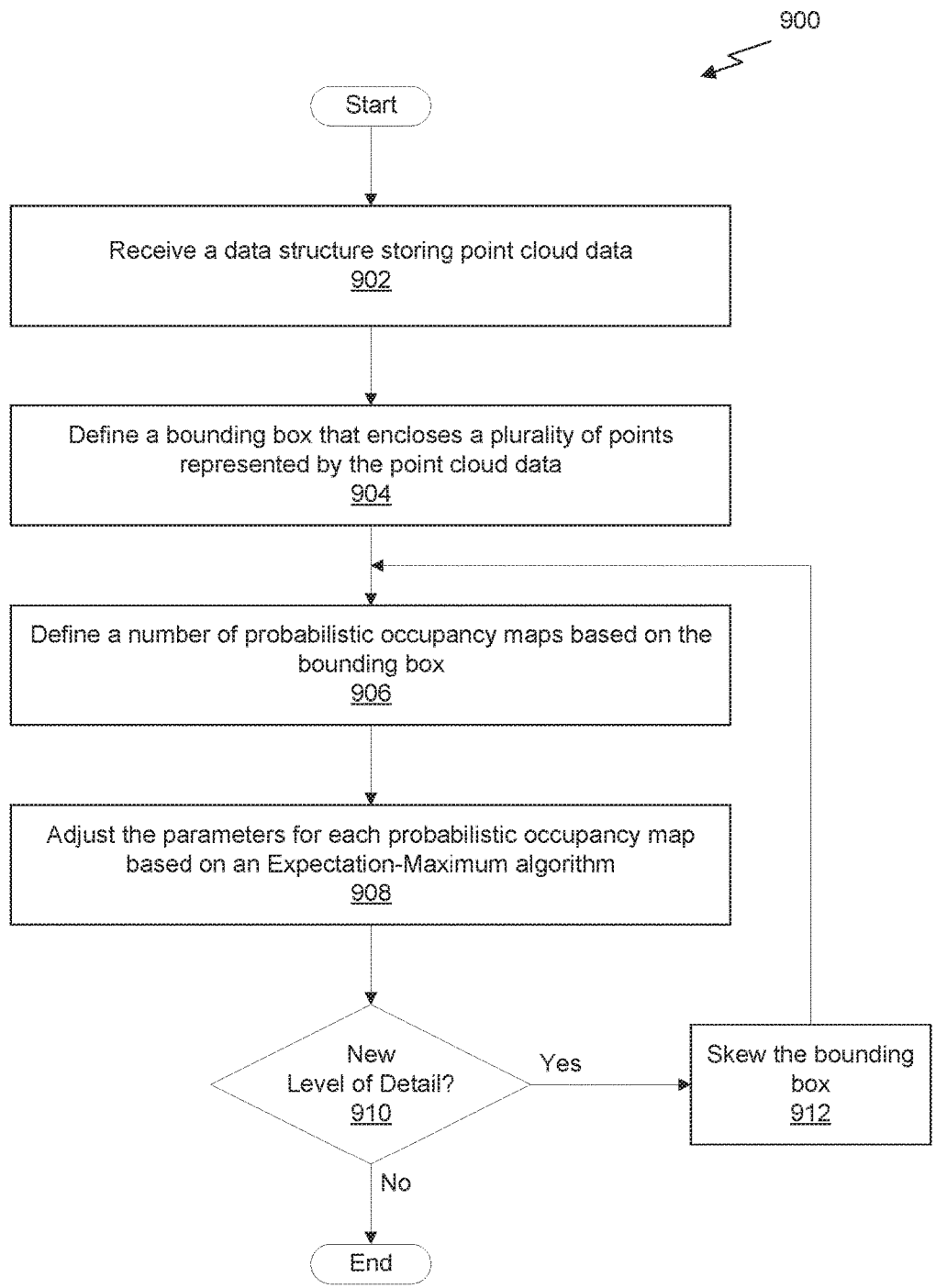
FIG. 9 illustrates a flowchart of a method for generating a Gaussian mixture model hierarchy based on a point cloud, in accordance with one embodiment.

FIG. 9 illustrates a flowchart of a method 900 for generating a GMM hierarchy based on a point cloud 800, in accordance with one embodiment. At step 902, a data structure storing a point cloud 800 is received at a processor. The point cloud 800 may be stored in a memory such as memory 204 and portions (i.e., point objects) of the data structure may be read from memory by the processor and stored in a local cache, such as the L2 cache 360.

At step 904, a bounding box 810 is defined that encloses the plurality of points represented by the point cloud 800. In one embodiment, the PPU 200 scans the point cloud 800 to determine a minimum and maximum value for each coordinate (e.g., x-coordinate, y-coordinate, and z-coordinate) for every point in the point cloud 800. The bounding box 810 may be defined by the minimum and maximum values for the coordinates, with each plane of the bounding box 810 corresponding to one of the values.

At step 906, a number of probabilistic occupancy maps are defined based on the bounding box 810. Each probabilistic occupancy map may be represented by a Gaussian basis function located at a vertex of the bounding box. At step 908, the parameters for each of the probabilistic occupancy maps are adjusted based on an EM algorithm. It will be appreciated that the EM algorithm is executed based on the probabilistic occupancy maps represented by the Gaussian basis functions as well as a uniform noise distribution function to prevent the results of the EM algorithm from being skewed. At step 910, each of the probabilistic occupancy maps is analyzed to determine if a particular node of the GMM hierarchy should be segmented into a number of child nodes. Segmentation of a node into a number of child nodes may refer to generating a new level of detail in the GMM hierarchy.

For each parent node that requires a new level of detail in the GMM hierarchy, then, at step 912, the bounding box 810 is skewed based on the parameters of the probabilistic occupancy map associated with the parent node. In one embodiment, a new bounding box corresponding to the parent node is defined. For example, the new bounding box is centered at a location specified by the mean μ for the probabilistic occupancy map associated with the parent node and having a size, in each dimension, based on the covariance matrix Σ for the parent surface. After the new bounding box is defined for the new level of detail, steps 906 and 908 are repeated for the new bounding box. For example, at step 906, a number of new probabilistic occupancy maps are defined based on the new bounding box and, at step 908, the parameters for the new probabilistic occupancy maps are adjusted based on the EM algorithm. This loop may be repeated recursively for each new level of detail added to the GMM hierarchy.

Returning to step 910, when none of the probabilistic occupancy maps require a new level of detail, the method 900 is terminated. In one embodiment, when a probabilistic occupancy map is analyzed, stopping criteria may be compared to the probabilistic occupancy map in order to determine whether a new level of detail is needed. If the stopping criteria are met, then no new level of detail is required for the GMM hierarchy. Once all levels of detail have been defined and all probabilistic occupancy map of the GMM hierarchy meet the stopping criteria, then the method 900 is terminated and the GMM hierarchy is complete.

FIGS. 10A-10D illustrate a technique for extracting iso-surfaces from a GMM hierarchy, in accordance with one embodiment. It will be appreciated that the GMM hierarchy is a statistical model based on data likelihood. As such, it is possible to define an iso-value such that a one or more iso-surfaces can be extracted from the GMM hierarchy.

One common technique for performing iso-surface extraction is implemented with a traditional marching cubes algorithm. The technique begins by dividing a 3D space into a plurality of discrete voxels. The marching cubes algorithm is applied to determine which voxels are active. A voxel is active when at least one vertex of the voxel is associated with a value above an iso-value and at least one other vertex of the voxel is associated with a value below the iso-value. In other words, an iso-value is chosen to determine the locations where the probability of solid matter being located at a particular point crosses the iso-value.

However, traditional application of the marching cubes algorithm is inefficient. Typical models include many areas having no surfaces or solid matter and, therefore, sampling these voxels is wasteful. For example, data from a range sensor typically includes points from the nearest surface to the sensor, which are only located in a small subset of the total volume of the 3D space. As such, the marching cubes algorithm is inefficient since each voxel is sampled to determine if the voxel is active. A more efficient approach would extract the iso-surfaces sparsely over the volume, only sampling voxels close to the areas of high probability as specified by the GMM hierarchy.

Given that the underlying structure of the GMM hierarchy is a PDF composed of a plurality of Gaussian basis functions, in the context of the point cloud data, each Gaussian basis function has a certain spatial extent. In other words, voxels a certain distance from the mean of a Gaussian basis function have a low probability of representing points in an iso-surface represented by that Gaussian basis function. The distance at which the probability drops below a minimum threshold value is based on the covariance matrix Σ associated with that Gaussian basis function.

In one embodiment, a sparse list of voxel probabilities is constructed by stochastically sampling points directly from the GMM hierarchy to perform a Monte Carlo estimation of voxels that lie near an iso-value crossing. This technique may be referred to herein as an importance sampling algorithm. More formally, a probability estimate may be calculated for each voxel by integrating the probabilistic occupancy map defined by the GMM hierarchy over the volume of the voxel, as follows:

$$p(V_k|\Theta) = \int_{v_k} \Sigma_{j=1}^{J+1} \pi_j p(v|\Theta_j) dv \qquad \text{(Eq. 15)}$$

where $V_k$ is a particular voxel. Since there is no analytical solution to Equation 15, the probability estimate is calculated using Monte Carlo sampling. It will be appreciated that the probabilistic occupancy maps in the GMM hierarchy identify locations of high probability within the 3D space. Thus, sampling each probabilistic occupancy map and binning the resulting samples by voxel will identify a sparse voxel list associated with high probability estimates. This sparse voxel list may be used to increase the efficiency of the marching cubes algorithm.

Sampling the GMM hierarchy may be performed very efficiently if the GMM hierarchy is re-interpreted as a weighted sum of zero-mean, isotropic Gaussian basis functions that have been skewed and shifted through 3D space. In order to re-interpret the GMM hierarchy, a Cholesky decomposition of the covariance matrix is performed ($\Sigma_j = U_j^T U_j$) such that multi-variate normal equation can be rewritten as:

$$N(x_i|\Theta_j) = \xi_j^{-1} e^{-1/2(x_i-\mu_j)_T U_j^T U_j (x_i-\mu_j)} = \xi_j^{-1} e^{-1/2\|A_j x_i - b_j\|^2} \qquad \text{(Eq. 16)}$$

where $A_j = U_j$ and $b_j = U_j \mu_j$, and $\xi_j$ is a normalization factor. Based on an examination of Equation 16, each input $x_i$ can be interpreted as undergoing an affine transformation before being evaluated through a zero-mean Gaussian basis function with identity covariance. Thus, sampling the GMM hierarchy can be performed by simply sampling each probabilistic occupancy map over the range [0, 1] in three dimensions and then transforming the sampled values through a probit function ($\phi^{-1}$). The transformed samples may be the same for each probabilistic occupancy map of the GMM hierarchy. Once the collection of transformed samples has been defined, a probability estimate may be calculated by keeping track of a proportion of samples, per probabilistic occupancy map included in the GMM hierarchy, that are associated with each voxel and then multiplying the ratio by an appropriate mixing parameter for the probabilistic occupancy map, as shown in Equation 17:

$$p(V_k|\Theta) \approx \sum_{j=1}^{j+1} \frac{\pi_j}{N} \sum_{i=1}^{i=N} I_{V_k}(x_i), \qquad \text{(Eq. 17)}$$

where $x_i \sim N(\mu_j|\Sigma_j)$ and I is an indicator function for whether $x_i$ falls within the bounds of voxel $V_k$. Since all samples may be pre-calculated before reconstruction, the entire process simply amounts to binning the results of a number of different affine transformations over a relatively small set of static points. A relatively low number of samples can be used to sample each probabilistic occupancy map to get sufficient results (e.g., 32 samples per probabilistic occupancy map) with low variance.

In one embodiment, the first step to extract surfaces from the GMM hierarchy is to define a volume and voxel resolution for performing the importance sampling algorithm. The volume may be related to a viewing frustum based on a camera position and orientation in relation to the scene represented by the GMM hierarchy. It will be appreciated that the volume may not encompass the entire scene, but only the extents of the viewing frustum such that the points inside the volume contribute to the rendering of the scene and points outside the volume do not contribute to the rendering of the scene. In other words, the points associated with the point cloud represented by the GMM hierarchy may span a first volume that completely encloses the scene, and the defined volume and voxel resolution utilized for extracting iso-surfaces from the GMM hierarchy may only consist of a subset of the first volume. Thus, the maximum volume and voxel resolution can be fixed in order to ensure that interactive rendering rates are possible for a given architecture. For example, a volume size associated with the viewing frustum at a fixed voxel resolution of $256^3$ may ensure interactive frame rates may be maintained. When the viewing frustum encompasses the entire scene represented by the GMM hierarchy, then the probabilistic occupancy maps may be sampled at a coarse sampling resolution. However, when the viewing frustum is changed to zoom into a portion of the scene, then the same voxel resolution coupled with a smaller volume may sample the probabilistic occupancy maps at a fine sampling resolution. Voxel resolution may be increased or decreased depending on the availability of computation resources and various implementation requirements. For example, voxel resolution may be fixed at $256^3$ on a mobile platform including an SoC with one or more parallel processing cores, but voxel resolution may be increased to $512^3$ or $1028^3$ on a desktop platform with multiple high power discrete GPUs accessible over a high-speed serial bus such as a PCIe bus.

Figure 10A:
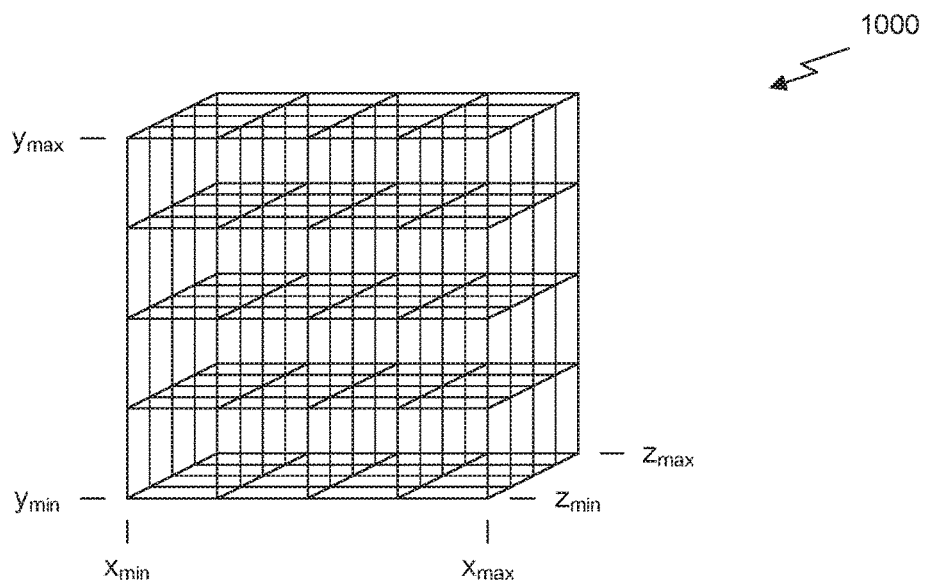
FIGS. 10A-10D illustrate a technique for extracting surfaces from a Gaussian mixture model hierarchy, in accordance with one embodiment.

As shown in FIG. 10A, an axis-aligned bounding volume 1000 is shown having minimum and maximum coordinates for each of the three dimensions (i.e., $x_{min}$, $x_{max}$, $y_{min}$, $y_{max}$, $z_{min}$, and $z_{max}$). The volume 1000 has been divided into a set of 64 voxels associated with a voxel resolution of $4^3$ (i.e., each dimension of the volume is divided into 4 discrete ranges). This voxel resolution is selected for illustration only as actual voxel resolutions will typically be much higher (e.g., $256^3$).

In a next step, an active voxel list may be generated via the importance sampling algorithm. First, a set of N transformed samples is created, where each sample is a vector of values between zero and one. The values in each sample may be generated with a random number generator. Alternatively, the samples may represent a uniform distribution within the range of values. Then, each value in the sample is transformed based on the probit function. The output of the probit function is a normally distributed value with zero mean and identity covariance. Each of the N transformed samples represents a point associated with each probabilistic occupancy map in the GMM hierarchy, wherein the location of a point corresponding to that transformed sample for a particular surface may be determined based on the mean $\mu_j$ and the covariance matrix $\Sigma_j$ associated with the probabilistic occupancy map. In other words, the location of a point $p_i$ associated with a probabilistic occupancy map $\Theta_j$ corresponding to a transformed sample $x_i$ is given by the following equation:

$$p_i = A_j x_i - b_j \qquad \text{(Eq. 18)}$$

Figure 10B:
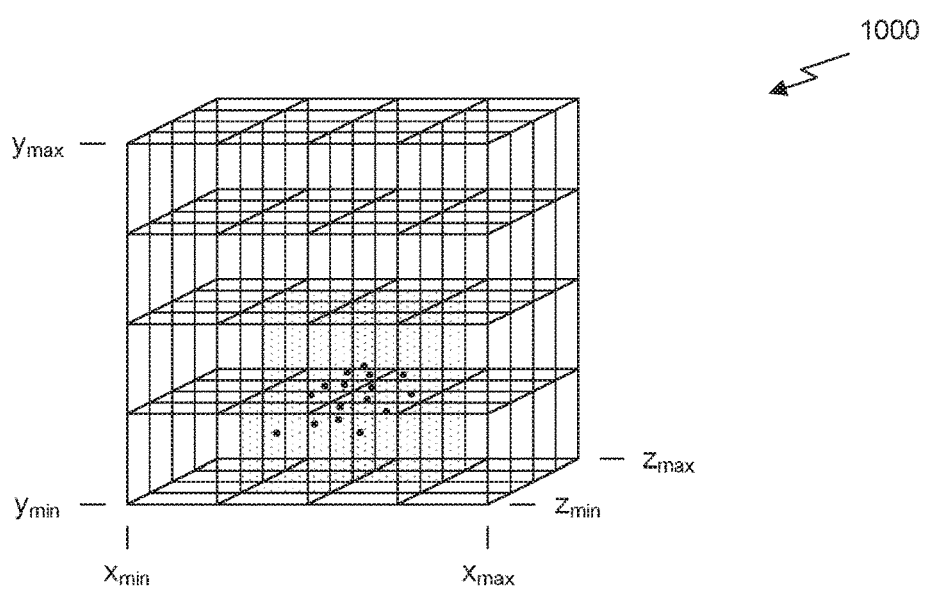

It will be appreciated that the transformed samples X may be pre-determined and are the same for each probabilistic occupancy map $\Theta_j$, but the affine transformation defined by Equation 18 is unique to each probabilistic occupancy map. Thus, the points $p_i$ are uniquely located within the volume for each probabilistic occupancy map, even though the transformed samples are the same for each probabilistic occupancy map. Each point $p_i$ is then binned according to the voxel index, if any, that the point intersects. As shown in FIG. 10B, each point $p_i$ may fall within the bounds of the volume 1000. As an illustration, 16 transformed samples have been used to identify 16 points $p_i$ that fall within the volume 1000 for a single probabilistic occupancy map $\Theta_j$. For each dimension of point $p_i$, the coordinate value for the dimension must fall within the minimum and maximum values for the coordinate defined for the volume. If the coordinate values for point $p_i$ in all three dimensions are within the volume, then a voxel index for the voxel that intersects the point $p_i$ may be calculated according to the following equations:

$$v_x = r_x \left( \frac{p_{ix} - x_{min}}{x_{max} - x_{min}} \right) \qquad \text{(Eq. 19)}$$

$$v_y = r_y \left( \frac{p_{iy} - y_{min}}{y_{max} - y_{min}} \right) \qquad \text{(Eq. 20)}$$

$$v_z = r_z \left( \frac{p_{iz} - z_{min}}{z_{max} - z_{min}} \right), \qquad \text{(Eq. 21)}$$

where r that specifies the voxel resolution of the volume in each of the dimensions. It will be appreciated that the voxel index v is a vector of three coordinates, each coordinate being the integer result of equations 19, 20, and 21. Care may need to be taken when the point $p_i$ falls on a discrete boundary between voxels. In other words, when the point $p_i$ falls on a plane that divides any two voxels, the point $p_i$ may be binned to one voxel or both voxels, depending on the implementation. The voxel index v may be used to increment a voxel map that keeps a count for each voxel in the volume. Thus, the voxel map stores an integer value for each voxel that represents the number of points $p_i$ that intersect that voxel. As shown, the 16 points $p_i$ in FIG. 10B intersect six voxels in the volume 1000, with each of those six voxels having one or more points $p_i$ intersect that particular voxel.

Once all of the probabilistic occupancy maps have been sampled, the integer values in the voxel map may be divided by N (i.e., the number of transformed samples) to arrive at a probability estimate for each of the voxels. Any voxel having a probability estimate above a threshold value may be identified as an active voxel and added to the sparse voxel list. In one embodiment, the voxel map for volume 1000 may include six non-zero values for the 64 voxels, and each of these six voxels may be added to the sparse voxel list based on a threshold value of 0 (i.e., all non-zero probability are considered active voxels). In another embodiment, the threshold value may be more than zero such that some minimum number of points $p_i$ must intersect a particular voxel before that voxel is identified as active. For example, if 64 transformed samples are utilized, a voxel may only be considered active if more than 3 points $p_i$ intersect with that voxel, corresponding to a threshold value of $$\sim 0.04\left(\frac{3}{64}\right).$$

Figure 10C:
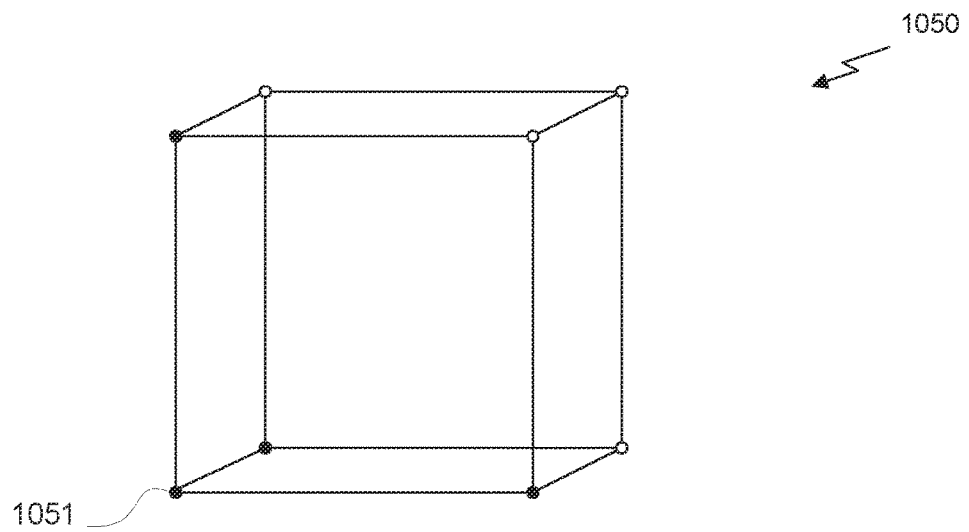

In the next step, the sparse voxel list is provided as an input to the modified marching cubes algorithm. In the modified marching cubes algorithm, each voxel in the sparse voxel list is tested. More specifically, for each voxel in the sparse voxel list, a probability value is calculated for each vertex of the voxel by sampling the GMM hierarchy using the location of the vertex. The probability value may be calculated recursively using the tree structure of the GMM hierarchy. As shown in FIG. 10C, a voxel 1050 includes eight vertices, such as vertex 1051. The location of each of the vertices is known based on the uniform division of the volume 1000. In other words, a location of each vertex may be calculated using the voxel index and the size each voxel along with the location of the volume 1000.

Similar to the traditional marching cubes algorithm, the pattern of vertices having a probability value above an iso-value and vertices having a probability value below an iso-value identifies one or more polygons that are included within the voxel. If all vertices of the voxel have a probability value above or below the iso-value, then the voxel may be discarded. One implementation of the traditional marching cubes algorithm is described in more detail in "Marching cubes: A high resolution 3d surface construction algorithm," Lorensen et al., SIGGRAPH, 1987, pp. 163-169, which is incorporated herein in its entirety.

As shown in FIG. 10C, each probability value calculated for a vertex may be compared against a particular iso-value. The iso-value may be selected to extract an iso-surface from the GMM hierarchy. For example, an iso-value of 0.25 may be selected for extracting a plurality of polygons from the GMM hierarchy corresponding to the iso-value of 0.25. Different iso-values may result in different iso-surfaces being extracted depending on the covariance matrix $\Sigma$ associated with each probabilistic occupancy map and the resolution of the voxels defined for the volume. In FIG. 10C, vertices colored black may represent vertices having a probability value below a particular iso-value and vertices colored white may represent vertices having a probability value above a particular iso-value. The pattern of four vertices being below the iso-value and four vertices being above the iso-value may be used to identify a polygon in the voxel associated with the iso-surface that intersects the voxel.

For example, an eight-bit mask may be created for a voxel with each bit in the mask set or cleared depending on whether the probability value for a corresponding vertex is above or below a particular iso-value. For a particular vertex, if the probability value is below the iso-value, then the corresponding bit in the mask is cleared, but if the probability value is above the iso-value, then the corresponding bit in the mask is set. The eight bit mask may be used as an index into a set of 256 ($2^8$=256) pre-calculated polygon configurations within the voxel. The pre-calculated polygon configurations represent approximate locations of one or more iso-surfaces included within a voxel that would result in the set of probability values calculated for the vertices of the voxel. The actual locations of the vertices for each polygon in a particular configuration may be determined by interpolating the locations of the vertices of the polygon on an edge of the voxel based on the probability values calculated for the vertices that share that edge. In addition, the normal vector for a vertex may be calculated based on an interpolation of gradients of the probability values along the edges of the voxels. The normal vectors may be useful for applying some illumination model or lighting when rendering the extracted surfaces.

Figure 10D:
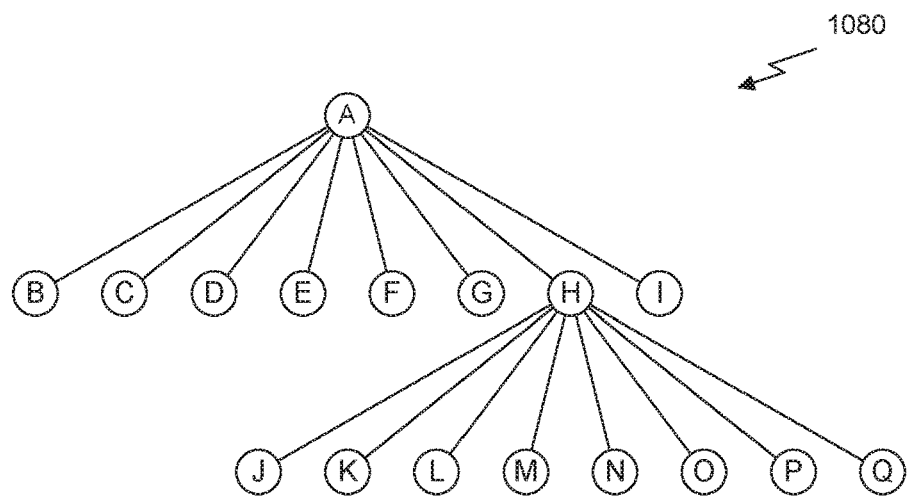

Again, a probability value for a vertex may be calculated utilizing the GMM hierarchy. As shown in FIG. 10D, the GMM hierarchy 1080 may be encoded as a tree data structure with a hierarchy representing different levels of detail. In one embodiment, the GMM hierarchy 1080 is encoded as a tree where each node of the tree is associated with eight child nodes. A root node, A, represents the top level (level 0) of the GMM hierarchy 1080. The root node has eight child nodes, B-I, that represent the next level (level 1) of the GMM hierarchy 1080. Each of the child nodes may have zero or more child nodes in another level of the GMM hierarchy 1080, and each of those child nodes may have zero or more child nodes in another level of the GMM hierarchy 1080, and so forth. As shown in FIG. 10D, node H includes eight child nodes, J-Q, at the next level (level 2) of the GMM hierarchy 1080. It will be appreciated that the tree may be unbalanced in that nodes at a particular level may not have child nodes while other nodes at that particular level have child nodes.

In order to calculate a probability value for a particular vertex, the GMM hierarchy 1080 will be sampled based on the location of the vertex. For example, the location of a vertex, such as vertex 1051, may be used to calculate a probability for each surface represented by the GMM hierarchy 1080. The process begins by calculating a probability value for the root node, node A. The probability value of a point being associated with the root node is 1 (i.e., 100%) because the root node does not represent one of the J probabilistic occupancy maps, but instead represents the fact that all points in the model are represented by the GMM hierarchy. The probability value for the node is then multiplied by the sum of probability values for each child node of that node. Thus, the probability value for the root node is simply the sum of the probability values for each of the child nodes of the root node.

The probability value for a child node may be calculated simply by applying the location of the vertex as x in Equation 1 and using the mean $\mu_j$ and covariance matrix $\Sigma_j$ for the corresponding probabilistic occupancy map encoded by the mixel in the child node to calculate the probability value for the vertex. The process may be recursively repeated for that node if the node also has child nodes at higher levels of detail. For example, node H is associated with eight child nodes. So, once a probability value has been calculated for node H corresponding to the probabilistic occupancy map encoded by the mixel in node H, that probability value may be multiplied by the sum of probability values for nodes J through Q. Although not shown explicitly, if any of nodes J through Q has child nodes, then the contribution of that node to the sum of probability values for nodes J through Q may be calculated in a similar fashion with the probability value calculated for that node being multiplied by the sum of probability values for that node's child nodes, and so on and so forth through any number of levels of detail.

It will be appreciated that the GMM hierarchy may be generated with a number of levels of detail. The number of levels of detail included in the GMM hierarchy may be dynamically determined based on the point cloud data and one or more parameters that specify stopping criteria. However, when using the GMM hierarchy to extract iso-surfaces, probability values may be calculated only up to a certain level of detail that does not have to match the total levels of detail in the GMM hierarchy. For example, the GMM hierarchy may have 32 levels of detail, but the modified marching cubes algorithm may only need to calculate probability values up to, e.g., 16 levels of detail. By performing less calculations the results may not be as accurate, but the reduced accuracy may be more beneficial in order to maintain, e.g., interactive frame rates. Such considerations, especially on mobile platforms, may outweigh the loss in accuracy. Thus, in one embodiment, a parameter may be associated with the modified marching cubes algorithm that indicates a maximum level of detail for calculating probability values.

A mesh or a set of polygons is identified after processing each voxel in the sparse voxel list. The polygons may then be rendered by conventional techniques for rendering polygons. For example, each polygon may be processed according to the graphics pipeline 600. In another embodiment, two or more sets of iso-surfaces may be extracted from the GMM hierarchy based on different iso-values. Each set of polygons corresponding to different iso-values may then be rendered in separate images or multiple sets of polygons corresponding to different iso-values may be rendered in the same image. For example, a set of iso-values may be defined within a specific range (e.g., 0.75, 0.5, and 0.25). Sets of polygons corresponding to the different iso-surfaces may then be extracted from the GMM hierarchy for each of the iso-values in the set of iso-values. Then, polygons corresponding to each iso-value may be rendered using different colors and/or transparency parameters. For example, a set of polygons corresponding to the 0.75 iso-value may be rendered in blue with 0% transparency, a set of polygons corresponding to the 0.5 iso-value may be rendered in green with 40% transparency, and a set of polygons corresponding to the 0.25 iso-value may be rendered in red with 70% transparency. The resulting image may reveal surfaces associated with varying levels of confidence based on the model. It will be appreciated that rendering the surfaces extracted from the GMM hierarchy as defined for the set of voxels may be performed according to any well-known methods in the prior art.

Figure 11:
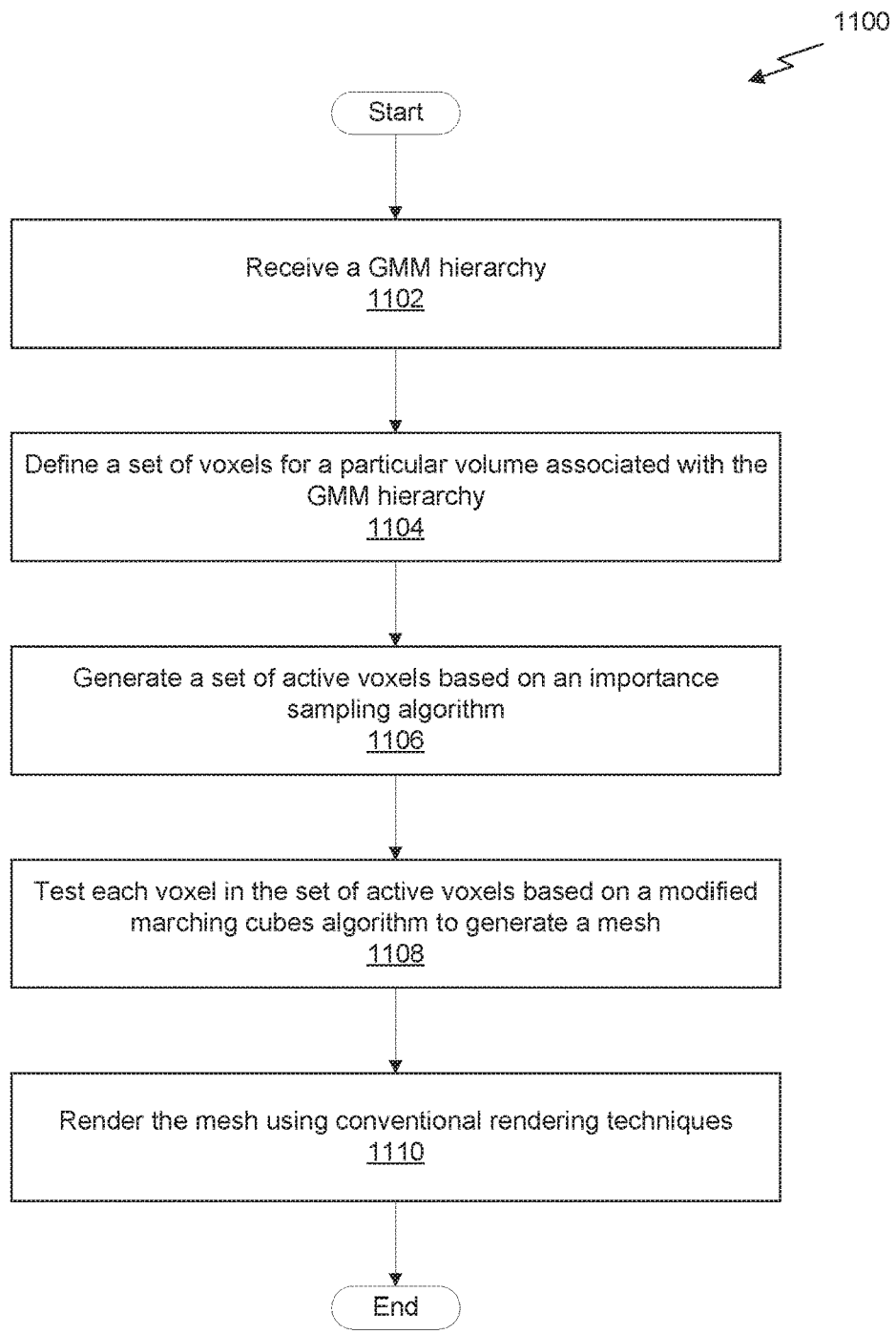
FIG. 11 illustrates a flowchart of a method for generating a mesh based on a Gaussian mixture model hierarchy, in accordance with one embodiment.

FIG. 11 illustrates a flowchart of a method 1100 for generating a mesh based on a GMM hierarchy, in accordance with one embodiment. At step 1102, a data structure storing a GMM hierarchy 1180 is received at a processor. In one embodiment, the GMM hierarchy 1080 is a tree, where each node in the tree is encoded to store parameters for a probabilistic occupancy map that represents a Gaussian basis function. The GMM hierarchy 1180 may be stored in a memory such as memory 204 and portions (i.e., nodes) of the data structure may be read from memory by the processor and stored in a local cache, such as the L2 cache 360.

At step 1104, a set of voxels is defined for a particular volume. The set of voxels may be determined based on a desired voxel resolution. The particular volume may be determined based on a viewing frustum associated with the model. The viewing frustum may define a position and an orientation of the camera relative to the model defined by the point cloud represented by the GMM hierarchy. In one embodiment, the set of voxels is defined statically, and the values in the GMM hierarchy are modified based on the desired viewing frustum by applying an affine transformation to the values in the GMM hierarchy 1080.

At step 1106, a set of active voxels is generated based on an importance sampling algorithm utilizing the probabilistic occupancy maps encoded by the GMM hierarchy 1080. In one embodiment, the PPU 200 samples the GMM hierarchy 1080 using a set of transformed samples generated using a Monte Carlo technique. The transformed samples may be vectors having three values that are the result of random numbers between zero and one that are transformed by the probit function. Each probabilistic occupancy map $\Theta_j$ in the GMM hierarchy is applied to the set of samples X to generate a set of points $p_i$ associated with the probabilistic occupancy map that are binned according to the set of voxels defined for the volume. The binning of the points for the probabilistic occupancy maps of the GMM hierarchy identifies a set of active voxels associated with at least one point identified based on the transformed samples.

At step 1108, each voxel in the set of active voxels is tested based on the modified marching cubes algorithm to generate a mesh of polygons. In one embodiment, a probability value is calculated for each vertex of a voxel, the probability values are tested against a particular iso-value to generate an eight bit mask for the voxel, and the mask is used to identify whether the voxel contains one or more polygons. A set of polygons may be identified for at least some of the voxels in the sparse voxel list.

At step 1110, the mesh is rendered using conventional rendering techniques. In one embodiment, the mesh may be rendered by a parallel processing unit according to the graphics pipeline 600.

Figure 12:
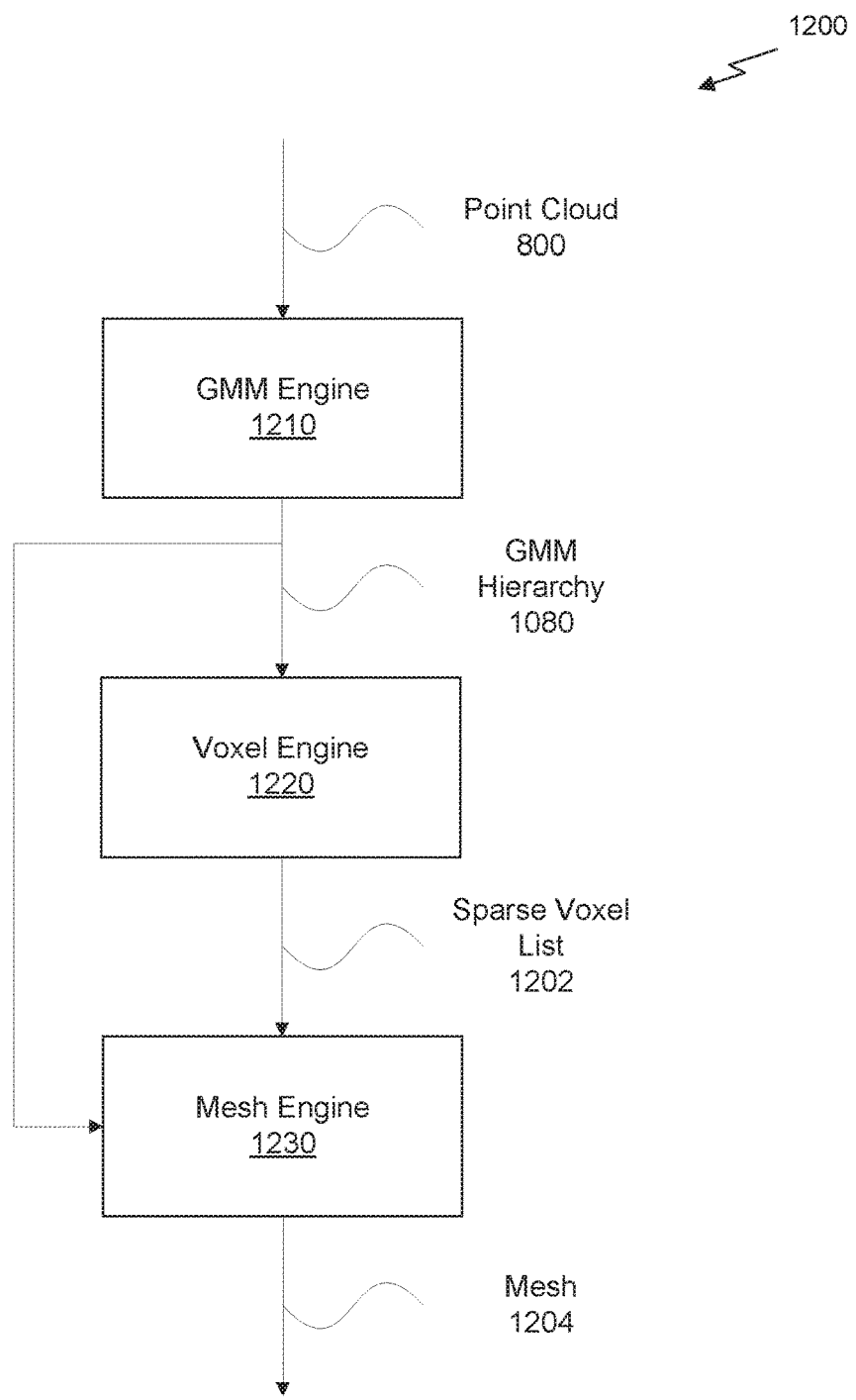
FIG. 12 illustrates a system for implementing the functionality of the various previous embodiments, according to one embodiment.

FIG. 12 illustrates a system 1200 for implementing the functionality of the various previous embodiments, according to one embodiment. The system 1200 includes a GMM engine 1210, a voxel engine 1220, and a mesh engine 1230. The GMM engine 1210 receives point cloud data 800 and generates a GMM hierarchy 1080 by implementing method 900. The voxel engine 1220 receives the GMM hierarchy 1080 and generates a sparse voxel list 1202 based on the importance sampling algorithm. The mesh engine 1230 receives the sparse voxel list 1202 and the GMM hierarchy 1080 and generates a mesh 1204 by implementing the modified marching cubes algorithm. The mesh 1204 may be rendered according to conventional rendering techniques, such as by rendering the polygons of the mesh 1204 by the PPU 200 using the graphics pipeline 600.

In one embodiment, the GMM engine 1210, the voxel engine 1220, and the mesh engine 1230 may be dedicated hardware units implemented within an application specific integrated circuit (ASIC). In another embodiment, the GMM engine 1210, the voxel engine 1220, and the mesh engine 1230 may be implemented, at least in part, as software executed on one or more processors. The algorithms may be implemented on a host processor (i.e., a CPU) with portions of the algorithm executed on a co-processor (i.e., a PPU). In one embodiment, the host processor and one or more co-processors may be implemented as separate cores on a single integrated circuit, such as a System on Chip (SoC). It will be appreciated that one or more of the engines may be implemented as dedicated hardware units while one or more of the other engines may be implemented in software.

Figure 13:
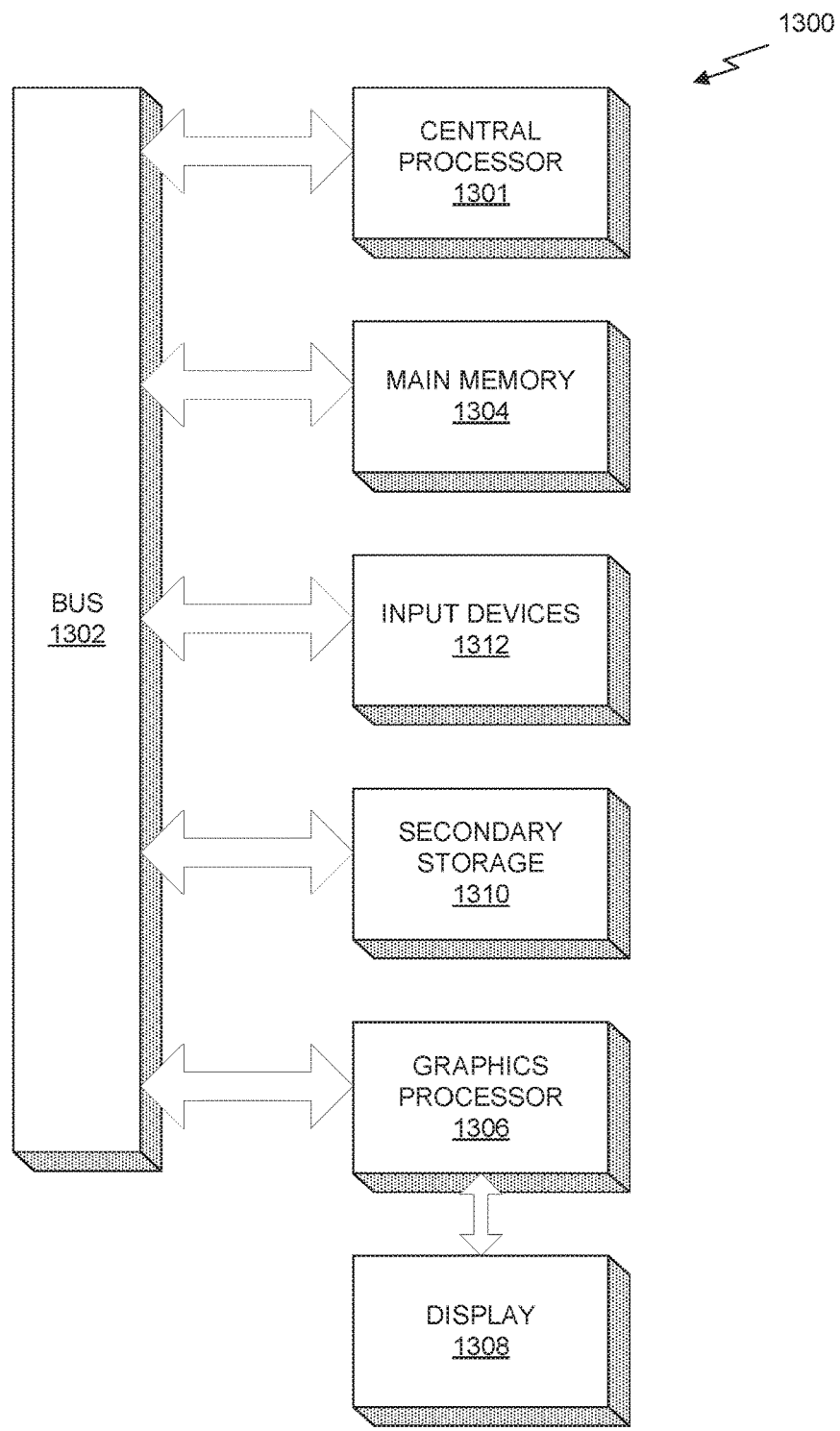
FIG. 13 illustrates an exemplary system in which the various architecture and/or functionality of the various previous embodiments may be implemented.

FIG. 13 illustrates an exemplary system 1300 in which the various architecture and/or functionality of the various previous embodiments may be implemented. As shown, a system 1300 is provided including at least one central processor 1301 that is connected to a communication bus 1302. The communication bus 1302 may be implemented using any suitable protocol, such as PCI (Peripheral Component Interconnect), PCI-Express, AGP (Accelerated Graphics Port), HyperTransport, or any other bus or point-to-point communication protocol(s). The system 1300 also includes a main memory 1304. Control logic (software) and data are stored in the main memory 1304 which may take the form of random access memory (RAM).

The system 1300 also includes input devices 1312, a graphics processor 1306, and a display 1308, i.e. a conventional CRT (cathode ray tube), LCD (liquid crystal display), LED (light emitting diode), plasma display or the like. User input may be received from the input devices 1312, e.g., keyboard, mouse, touchpad, microphone, and the like. In one embodiment, the graphics processor 1306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1300 may also include a secondary storage 1310. The secondary storage 1310 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage 1310. Such computer programs, when executed, enable the system 1300 to perform various functions. The memory 1304, the storage 1310, and/or any other storage are possible examples of computer-readable media.

In one embodiment, the architecture and/or functionality of the various previous figures may be implemented in the context of the central processor 1301, the graphics processor 1306, an integrated circuit (not shown) that is capable of at least a portion of the capabilities of both the central processor 1301 and the graphics processor 1306, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1300 may take the form of a desktop computer, laptop computer, server, workstation, game consoles, embedded system, and/or any other type of logic. Still yet, the system 1300 may take the form of various other devices including, but not limited to a personal digital assistant (PDA) device, a mobile phone device, a television, etc.

Further, while not shown, the system 1300 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a parallel processing unit, point cloud data defining a plurality of points;
defining a Gaussian Mixture Model (GMM) hierarchy that represents the point cloud data, wherein the GMM hierarchy is stored in a tree data structure in a memory and each node in the GMM hierarchy comprises a mixel encoding parameters for a probabilistic occupancy map corresponding to a sub-population of the points in the point cloud data; and
adjusting the parameters for one or more probabilistic occupancy maps in the GMM hierarchy by executing, via the parallel processing unit, a number of iterations of an Expectation-Maximum (EM) algorithm to fit the one or more probabilistic occupancy maps to the point cloud data.

2. The method of claim 1, wherein the EM algorithm comprises calculating a set of expectation values, at least in part, utilizing a uniform noise distribution function.

3. The method of claim 2, wherein the uniform noise distribution function is associated with a probability density function of the form:

$$p(x)=\epsilon,$$

where $\epsilon$ is constant across a bounding volume that encloses the plurality of points defined by the point cloud data.

4. The method of claim 1, wherein the parameters comprise a set of weighted moments.

5. The method of claim 1, wherein each probabilistic occupancy map encoded by the mixels is associated with a probability density function for a multi-variate Gaussian distribution of the form:

$$p(x|\mu,\Sigma) = \frac{1}{(2\pi)^{n/2}|\Sigma|^{1/2}} e^{\left(-\frac{1}{2}(x-\mu)^T \Sigma^{-1}(x-\mu)\right)},$$

where $\mu$ is a mean of the multi-variate Gaussian distribution and X is the covariance matrix of the multi-variate Gaussian distribution.

6. The method of claim 1, wherein each iteration of the EM algorithm comprises:
an E-step to calculate a set of expectation values, the set of expectation values corresponding to a particular point in the point cloud data and a particular probabilistic occupancy map of the GMM hierarchy; and
an M-step to adjust the parameters for the probabilistic occupancy maps based on the set of expectation values.

7. The method of claim 6, wherein the E-step is performed by the parallel processing unit to calculate the set of expectation values, and wherein at least two expectation values are calculated by the parallel processing unit in parallel.

8. The method of claim 7, wherein a number of threads are allocated in the parallel processing unit, each thread corresponding to a particular probabilistic occupancy map, and wherein a number of expectation values for a particular point are calculated substantially simultaneously by the number of threads.

9. The method of claim 1, further comprising generating a mesh by extracting iso-surfaces from the GMM hierarchy.

10. The method of claim 9, wherein generating the mesh comprises:
- defining a set of voxels corresponding to a volume associated with the GMM hierarchy;
- generating a set of active voxels by sampling the probabilistic occupancy maps, wherein the set of active voxels includes a subset of voxels in the set of voxels associated with the volume; and
- comparing probability values computed for each voxel in the set of active voxels against an iso-value to generate the mesh.

11. The method of claim 10, further comprising rendering the mesh.

12. A non-transitory computer-readable storage medium storing instructions that, when executed by a processor, cause the processor to perform steps comprising:
- receiving point cloud data defining a plurality of points;
- defining a Gaussian Mixture Model (GMM) hierarchy that represents the point cloud data, wherein the GMM hierarchy is stored in a tree data structure in a memory and each node in the GMM hierarchy comprises a mixel encoding parameters for a probabilistic occupancy map corresponding to a sub-population of the points in the point cloud; and
- adjusting the parameters for one or more probabilistic occupancy maps in the GMM hierarchy by executing a number of iterations of an Expectation-Maximum (EM) algorithm to fit the one or more probabilistic occupancy maps to the point cloud data.

13. The non-transitory computer-readable storage medium of claim 12, wherein the EM algorithm comprises calculating a set of expectation values, at least in part, utilizing a uniform noise distribution function.

14. The non-transitory computer-readable storage medium of claim 12, wherein the parameters comprise a set of weighted moments.

15. The non-transitory computer-readable storage medium of claim 12, wherein each probabilistic occupancy map encoded by the mixels is associated with a probability density function for a multi-variate Gaussian distribution of the form:

$$p(x \mid \mu, \Sigma) = \frac{1}{(2\pi)^{n/2} |\Sigma|^{1/2}} e^{\left(-\frac{1}{2}(x-\mu)^T \Sigma^{-1}(x-\mu)\right)},$$

where $\mu$ is a mean of the multi-variate Gaussian distribution and X is the covariance matrix of the multi-variate Gaussian distribution.

16. The non-transitory computer-readable storage medium of claim 12, wherein the processor is a parallel processing unit.

17. A system comprising:
- a memory storing point cloud data defining a plurality of points; and
- a parallel processing unit configured to:
  - define a Gaussian Mixture Model (GMM) hierarchy that represents the point cloud data, wherein the GMM hierarchy is stored in a tree data structure in the memory and each node in the GMM hierarchy comprises a mixel encoding parameters for a probabilistic occupancy map corresponding to a sub-population of the points in the point cloud, and
  - adjust the parameters for one or more probabilistic occupancy maps by executing a number of iterations of an Expectation-Maximum (EM) algorithm to fit the one or more probabilistic occupancy maps to the point cloud data.

18. The system of claim 17, wherein the EM algorithm comprises calculating a set of expectation values, at least in part, utilizing a uniform noise distribution function.

19. The system of claim 17, wherein each probabilistic occupancy map encoded by the mixels is associated with a probability density function for a multi-variate Gaussian distribution of the form:

$$p(x \mid \mu, \Sigma) = \frac{1}{(2\pi)^{n/2} |\Sigma|^{1/2}} e^{\left(-\frac{1}{2}(x-\mu)^T \Sigma^{-1}(x-\mu)\right)},$$

where $\mu$ is a mean of the multi-variate Gaussian distribution and X is the covariance matrix of the multi-variate Gaussian distribution.

20. The system of claim 17, wherein each iteration of the EM algorithm comprises:
- an E-step to calculate a set of expectation values, the set of expectation values corresponding to a particular point in the point cloud data and a particular probabilistic occupancy map of the GMM hierarchy; and
- an M-step to adjust the parameters for the probabilistic occupancy maps based on the set of expectation values.

* * * * *